US008482640B2

(12) United States Patent
Sugaw et al.

(10) Patent No.: US 8,482,640 B2
(45) Date of Patent: Jul. 9, 2013

(54) SOLID-STATE IMAGE SENSOR AND DRIVE METHOD FOR THE SAME

(75) Inventors: Shigetoshi Sugaw, Sendai (JP); Yasushi Kondo, Kyoto (JP); Hideki Tominaga, Uji (JP)

(73) Assignees: Tohoku University, Miyagi (JP); Shimadzu Corporation, Kyoto (JP)

( * ) Notice: Subject to any disclaimer, the term of this patent is extended or adjusted under 35 U.S.C. 154(b) by 584 days.

(21) Appl. No.: 12/676,505
(22) PCT Filed: Sep. 4, 2008
(86) PCT No.: PCT/JP2008/002426
§ 371 (c)(1), (2), (4) Date: Mar. 4, 2010
(87) PCT Pub. No.: WO2009/031302
PCT Pub. Date: Mar. 12, 2009

(65) Prior Publication Data
US 2010/0188538 A1    Jul. 29, 2010

(30) Foreign Application Priority Data
Sep. 5, 2007    (JP) .................................. 2007-230179

(51) Int. Cl.
H04N 5/335    (2011.01)
(52) U.S. Cl.
USPC ........................................................ 348/294
(58) Field of Classification Search
USPC .................. 348/294, 296, 308, 241; 257/291, 257/292; 250/208.1
See application file for complete search history.

(56) References Cited

U.S. PATENT DOCUMENTS
6,377,304 B1 *    4/2002    Saitoh ........................... 348/308
6,972,795 B1    12/2005    Etoh et al.
(Continued)

FOREIGN PATENT DOCUMENTS
EP    1 041 637 A    10/2000
JP    62-190753 A    8/1987
(Continued)

OTHER PUBLICATIONS
Chinese Office Action dated Aug. 23, 2011, for the corresponding Chinese Patent Application No. 200880105556.X.
(Continued)

Primary Examiner — Aung S Moe
Assistant Examiner — Amy Hsu
(74) Attorney, Agent, or Firm — Sughrue Mion, PLLC

(57) ABSTRACT

An independent pixel output line (14) is provided for each of two-dimensionally arranged pixels (10) within a pixel area (2a). A plurality of memory sections are connected to each pixel output line (14). In a continuous reading mode, photocharge storage is simultaneously performed at all the pixels, and signals are collectively transferred from the pixels (10) through the pixel output lines (14) to the memory sections, after which the signals held in the memory sections are sequentially read and outputted. In a burst reading mode, the operations of simultaneously storing photocharges at all the pixels and collectively transferring signals from each pixel (10) through the pixel output line (14) to the memory sections are sequentially performed for each of the memory sections to hold signals corresponding to a plurality of frames. When a imaging halt command is given, the holding of new signals is halted, and a plurality of frames of image signals held in the memory sections at that point in time are sequentially read and outputted. Thus, both an ultrahigh-speed imaging operation with a limitation on the number of frames and an imaging mode that is rather slow but has no limitation on the number of frames can be performed.

24 Claims, 15 Drawing Sheets

U.S. PATENT DOCUMENTS

| | | | |
|---|---|---|---|
| 7,990,424 B2* | 8/2011 | Chiba et al. | 348/220.1 |
| 2003/0052983 A1 | 3/2003 | Altree | |
| 2003/0206236 A1* | 11/2003 | Levantovsky | 348/310 |
| 2005/0270394 A1* | 12/2005 | Dierickx et al. | 348/308 |
| 2006/0044627 A1* | 3/2006 | Sato et al. | 358/474 |
| 2007/0103571 A1* | 5/2007 | Itoh | 348/252 |
| 2007/0109433 A1* | 5/2007 | Yamada et al. | 348/294 |

FOREIGN PATENT DOCUMENTS

| | | |
|---|---|---|
| JP | 63-174356 A | 7/1988 |
| JP | 05-336420 A | 12/1993 |
| JP | 2000-165750 A | 6/2000 |
| JP | 2001-345441 A | 12/2001 |
| JP | 2003-116056 A | 4/2003 |
| JP | 2006-245522 A | 9/2006 |
| TW | 411705 | 3/2000 |
| WO | 00/17930 A1 | 3/2000 |
| WO | 00/52759 A1 | 9/2000 |

OTHER PUBLICATIONS

Chinese Office Action dated May 8, 2012, issued in corresponding Chinese Patent Application No. 200880105556.X.

European Office Action dated Aug. 3, 2011, issued in corresponding European Patent Application No. 08829005.1.

Yasushi Kondo et al., "Development of "Hypervision HPV-1" High-speed Video Camera", Shimadzu Review, Sep. 30, 2005, pp. 79-86, vol. 62, Nos. 1-2.

European Patent Office Action dated May 23, 2012, issued in corresponding European Patent Application No. 08829005.1.

Office Action in corresponding Taiwanese Patent Application No. 97134048 dated Jan. 29, 2013.

Office Action in corresponding European Patent Application No. 08829005.1 dated Mar. 14, 2013.

* cited by examiner

Fig. 11
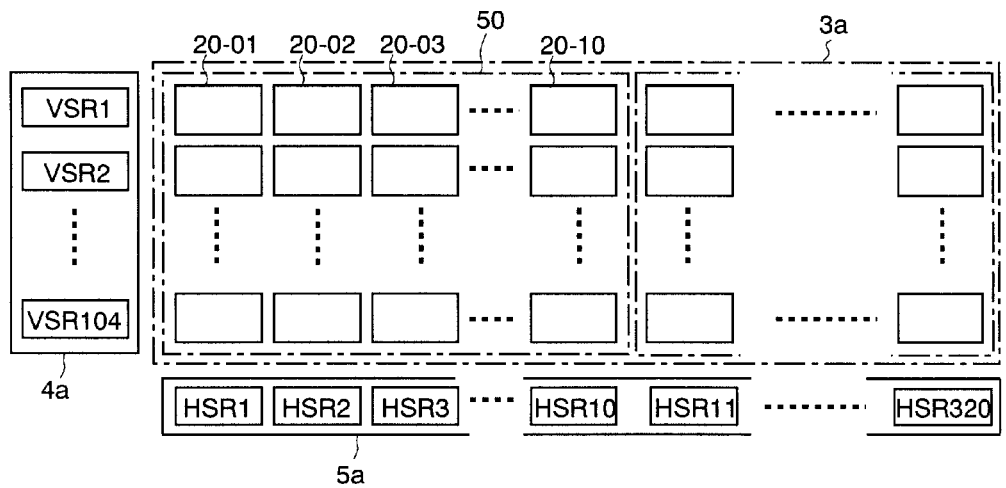
Fig. 12
(a) CONTINUOUS READING MODE (ONE FRAME ONLY)
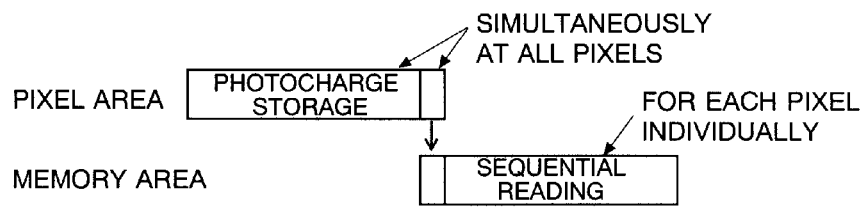
(b) CONTINUOUS READING MODE (REPEATED)
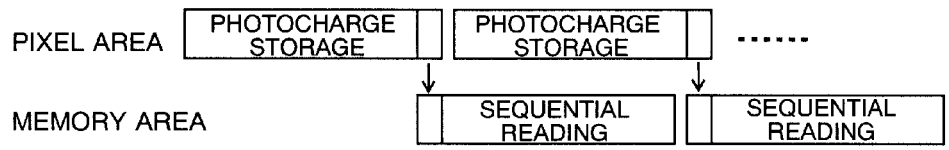
(c) BURST READING MODE
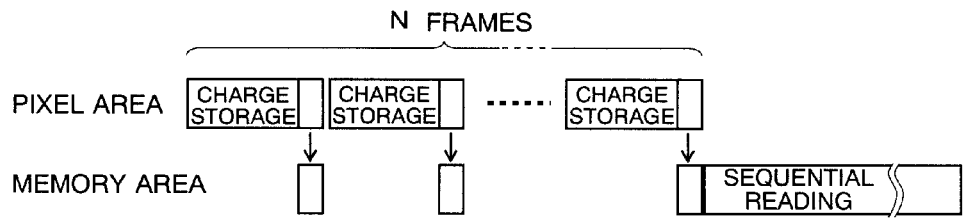

SOLID-STATE IMAGE SENSOR AND DRIVE METHOD FOR THE SAME

TECHNICAL FIELD

The present invention relates to a solid-state image sensor and a drive method for this sensor. More specifically, it relates to a solid-state image sensor capable of high-speed operations suitable for taking images of high-speed phenomena such as destructions, explosions and combustions, and a drive method for such a sensor.

BACKGROUND ART

High-speed imaging devices (high-speed video cameras) for taking consecutive images of high-speed phenomena such as explosions, destructions, combustions, collisions and discharges for only a short period of time have been conventionally developed (for example, refer to Non-Patent Document 1 and other documents). Such high-speed imaging devices need to perform an ultrahigh-speed imaging operation that exceeds a level of approximately one million frames per second. Accordingly, they use solid-state image sensors capable of high-speed operations, which have special structures different from those of the imaging devices conventionally used in normal video cameras, digital cameras and similar devices.

One example of this type of solid-state image sensor is disclosed in Patent Document 1 and other documents, which is referred to as an in-situ storage image sensor (IS-CCD). An outline of this image sensor is as follows: A storage CCD, which also serves for the transfer of a specified number of recorded images (frames), is provided for each photodiode as a photo-receiver. During an imaging operation, pixel signals resulting from photoelectric conversion by the photodiode are sequentially transferred to the storage CCD. After the imaging operation is completed, the pixel signals corresponding to the specified number of record frames stored in the storage CCD are collectively read, and the images corresponding to the specified number of record frames are reproduced outside the image sensor. During the imaging operation, pixel signals exceeding the specified number of image frames are discarded from the oldest ones. Thus, the latest set of pixel signals corresponding to the specified number of frames are held in the storage CCD. This means that, when the transfer of pixel signals to the storage CCD is suspended at the completion of the imaging operation, one can obtain the latest series of images ranging from the completion of the imaging operation back through a period of time corresponding to the specified number of record frames.

Thus, unlike general types of image sensors that require pixel signals to be extracted every time a set of pixel signals corresponding to one frame is obtained, the in-situ storage image sensor is characterized by its capability of acquiring a series of images at extremely high speeds over a plurality of frames. However, the number of storage CCDs that can be mounted on a single sensor is limited due to various factors, such as the limited area of a semiconductor chip and the restriction on power consumption. Accordingly, the number of frames available for the aforementioned high-speed imaging is limited. For example, the number of frames is approximately 100 in the case of the device disclosed in Non-Patent Document 1. This level of frame number may suffice for some applications. However, for some types of phenomena or objects, the imaging operation does not require a very high speed (e.g. one million frames per second) but should desirably be continued for a longer period of time or over a larger number of frames. In this case, it is difficult for the aforementioned in-situ storage image sensor to meet the demands for such an imaging mode.

Therefore, to support both an ultrahigh-speed imaging mode that has a limitation on the number of consecutive record frames and an imaging mode that is rather slow but has no limitation on the number of record frames, it is necessary to use both the previously described in-situ storage image sensor using CCDs and a commonly known image sensor such as a CMOS image sensor. Accordingly, this type of imaging system will be expensive.

In the aforementioned high-speed imaging, it is important to perform the imaging in synchronization with the timing of the occurrence of a phenomenon under observation. This is achieved by a control process in which the imaging action is initiated or discontinued in response to an externally given trigger signal. To generate this trigger signal, the system normally includes another sensor, such as a contact sensor, position sensor, vibration sensor or pressure sensor. However, it is often difficult in some situations to obtain appropriate trigger signals by this method, as in the case where the sensor cannot be easily placed close to the object, where the imaging action must capture a spontaneous change in the object under observation, or where the target of imaging is a micro-sized object under a microscope.

To address these problems, an imaging system disclosed in Patent Document 2 uses a light-splitting means, such as a beam splitter or half mirror, provided behind the imaging lens. The light-splitting means separates incident light into plural beams, which are respectively introduced into different imaging devices. One of these imaging devices is dedicated to a monitoring function to detect a sudden change in the image. According to a trigger signal generated by this imaging device, the storage of image signals produced by the other imaging devices is controlled. This type of conventional imaging system requires optical parts to split incident light coming from the object of imaging into plural beams, and additionally needs more than one imaging device (image sensor). Thus, the system will be large and complex, making it difficult to reduce the production cost and decrease the size and weight of the system.

Patent Document 1: Japanese Unexamined Patent Application Publication No. 2001-345441

Patent Document 2: Japanese Unexamined Patent Application Publication No. H05-336420

Non-Patent Document 1: Kondo et al., "Kousokudo Bideo Kamera HyperVision HPV-1 no Kaihatsu (Development of "HyperVision HPV-1" High-Speed Video Camera)", *Shimadzu Hyouron* (*Shimadzu Review*), Shimadzu Hyouron Henshuu-bu, Sep. 30, 2005, Vol. 62, No. 1/2, pp. 79-86

DISCLOSURE OF THE INVENTION

Problem to be Solved by the Invention

The present invention has been developed in view of the previously described problems. Its first objective is to provide a solid-state image sensor capable of both an ultrahigh-speed imaging mode that has a limitation on the number of record frames and another imaging mode that is rather slow but has no limitation on the number of record frames, and a method for driving this image sensor.

The second objective of the present invention is to provide a solid-state image sensor suitable for capturing a change in an object within a series of continuously taken images or an occurrence of a phenomenon under observation to correctly control the initiation, discontinuation and other actions of high-speed imaging, and a method for driving this image sensor.

Means for Solving the Problems

The present invention aimed at solving the aforementioned problems provides a drive method for a solid-state image sensor having a plurality of pixels arranged in a two-dimensional array; each pixel including at least a photoelectric conversion element for receiving light and producing photocharges, a transfer element for transferring the photocharges produced by the photoelectric conversion element to a detection node, and a buffer element for sending a signal from the detection node to a pixel output line; the pixel output line being independently provided for each pixel; one or more memory sections being provided for each pixel; the memory section being used to hold a signal extracted from each pixel through the pixel output line; and the method being characterized in that at least one of the following modes is performed:

a first drive mode, in which an operation of storing photocharges in each pixel and an operation of holding a signal extracted from the pixel through the pixel output line in one of the memory sections are performed simultaneously at all the pixels and, subsequently, the pixels and the memory sections are operated so that the signals corresponding to one frame are sequentially read from the memory sections corresponding to the pixels and outputted; and a second drive mode, in which the operation of storing photocharges in each pixel and the operation of holding a signal extracted from the pixel through the pixel output line in one of the memory sections are performed repeatedly and simultaneously at all the pixels while the memory section to hold the signal is sequentially selected, and after the signals corresponding to a plurality of frames are held in the memory sections, the pixels and the memory sections are operated so that the signals corresponding to the plurality of frames are sequentially read from the memory sections corresponding to the pixels and outputted.

As a preferable variation of the drive method for a solid-state image sensor according to the present invention, a plurality of memory sections are provided for each pixel, and the first drive mode and the second drive mode are selectively or concurrently performed.

A solid-state image sensor according to the present invention aimed at solving the previously described problems is a solid-state image sensor for implementing the previously described drive method, which is characterized by including:

a) a plurality of pixels arranged in a two-dimensional array, each pixel including a photoelectric conversion element for receiving light and producing photocharges, a transfer element for transferring the photocharges produced by the photoelectric conversion element to a detection node, and a buffer element for sending a signal from the detection node to a pixel output line to be mentioned later;

b) a pixel output line independently provided for each pixel;

c) a plurality of memory sections provided for each pixel in order to hold a signal extracted from the pixel through the pixel output line; and d) a drive control means for performing the following two drive modes:

a first drive mode, in which an operation of storing photocharges in each pixel and an operation of holding a signal extracted from the pixel through the pixel output line in one of the memory sections are performed simultaneously at all the pixels and, subsequently, the pixels and the memory sections are operated so that the signals corresponding to one frame are sequentially read from the memory sections corresponding to the pixels and outputted; and a second drive mode, in which the operation of storing photocharges in each pixel and the operation of holding a signal extracted from the pixel through the pixel output line in one of the memory sections are performed repeatedly and simultaneously at all the pixels while the memory section to hold the signal is sequentially selected, and after the signals corresponding to a plurality of frames are held in the memory sections, the pixels and the memory sections are operated so that the signals corresponding to the plurality of frames are sequentially read from the memory sections corresponding to the pixels and outputted.

For example, the photoelectric conversion element included in each pixel may be a photodiode, the detection node may be a floating diffusion (floating region), the transfer element may be a transistor (MOS transistor), and the buffer element may be a source follower amplifier composed of a plurality of transistors. The memory section (and memory unit) may be a combination of a capacitor and a switch such as a transistor.

In the second drive mode of the solid-state image sensor and its drive method according to the present invention, it is possible to perform continuous imaging at extremely high-speeds over a plurality of frames since there is no need to interrupt the continuous imaging operation to read the signals (pixel signals) obtained during the imaging operation to the outside of the sensor. The transfer of signals from each pixel to the memory section can be completed within an extremely short period of time. Therefore, the period of time required for taking one frame of image is mostly determined by the period of time required for receiving light by the photoelectric conversion element and storing the photocharges into the detection node or the like. However, in the second drive mode, the number of frames from which images can be read to the outside of the sensor at a later time is limited by the number of memory sections provided for each pixel. That is, if there are one hundred memory sections for each pixel, it is possible to obtain one hundred frames of continuous images.

On the other hand, in the first drive mode, it is necessary to read resultant pixel signals to the outside of the sensor every time one frame of image is taken, and this reading time limits the repetition rate of the imaging action. Therefore, the drive speed cannot be as high as in the second drive mode. However, the number of image frames is not limited by the number of memory sections provided for each pixel. Thus, according to the solid-state image sensor and its drive method according to the present invention, a single solid-state image sensor can perform both an ultrahigh-speed imaging operation (e.g. at one million frames per second or higher) and a rather slow but long-time imaging operation by appropriately switching the drive mode between the first and second modes according to the purpose of imaging and other factors. By using this, one can provide an imaging device that is relatively inexpensive yet widely applicable or that is highly usable.

Additionally, the operations according to the two drive modes can be linked to each other; for example, it is possible to initially operate the solid-state image sensor in the first drive mode and then switch to the second drive mode in response to a trigger signal which is generated when an occurrence of a phenomenon of interest or a change in an object has been recognized based on the pixel signals produced by the solid-state image sensor. By this method, it is possible to take accurate images of a targeted high-speed phenomenon even when a change in an object cannot be captured by a vibration sensor or other kinds of sensors or when such a sensor cannot be placed due to physical restrictions. The present imaging technique does not require additional imaging devices and hence contributes to the cost reduction of high-speed imaging systems.

As one variation of the solid-state image sensor and its drive method according to the present invention, it is preferable that:

one memory section corresponding to one pixel includes at least a memory unit for holding a noise signal and a memory unit for holding a signal corresponding to the photocharge;

an operation of simultaneously holding the noise signals at all the pixels and an operation of simultaneously holding the signals corresponding to the photocharges at all the pixels are performed at different timings during the operations of storing photocharges in each pixel and holding a signal extracted from the pixel through the pixel output lines in one of the memory sections; and when the signals are sequentially read from the memory sections, the noise signals and the signals corresponding to the photocharges are concurrently read from the memory units and outputted.

Examples of the noise signal includes a fixed pattern noise, such as a change in the threshold voltage of a transistor included in a buffer element, and a random noise that occurs in a detection node, such as a floating diffusion. These noise components are also superposed on the signal corresponding to the photocharges. In the aforementioned variation of the present invention, it is possible to obtain pixel signals with reduced influence of the noise by performing an analogue operation in which the noise signals are subtracted from the signals corresponding to the photocharges in the process of sequentially reading signals from the memory sections. This operation improves the signal-to-noise ratio of the resultant image.

As one variation of the solid-state image sensor and its drive method according to the present invention, it is preferable that:

each pixel includes at least one charge storage element for storing photocharges that have overflowed from the photoelectric conversion element via the transfer element or from the detection node during the operation of storing photocharges;

one memory section corresponding to one pixel has four memory units;

an operation of sequentially holding a noise signal before an overflow, a noise signal after an overflow, a signal corresponding to the charge before an overflow and a signal corresponding to the charge after an overflow through the pixel output lines in the four memory units in each pixel, respectively, is performed simultaneously at all the pixels during the operations of storing photocharges in each pixel and the operations of storing photocharges in each pixel and holding a signal extracted from the pixel through the pixel output lines in one of the memory sections; and when the signals are sequentially read from the memory sections, the noise signal before the overflow, the noise signal after the overflow, the signal corresponding to the charge before the overflow and the signal corresponding to the charge after the overflow are concurrently read from the memory units and outputted.

An example of the aforementioned charge storage element is a capacitor having a double polysilicon structure or stack structure.

To increase the photoelectric conversion gain in each pixel, it is desirable to reduce the capacitance of the detection node, such as a floating diffusion. However, in that case, the detection node may be saturated when a large amount of photocharges are produced by strong incident light. By contrast, in the aforementioned variation of the present invention, the photocharges that have been generated in the photoelectric conversion element and overflowed, for example, from the detection node are stored in the photocharge storage element. Therefore, even when a large amount of photocharges are produced by strong incident light, the photocharges will not be wasted but can be reflected in the signals. Conversely, when the incident light is weak and the amount of resultant photocharges is accordingly small, only the signals stored in the low-capacitance detection node are used. Thus, the dynamic range is widened by the aforementioned variation of the present invention.

In the second drive mode of the solid-state image sensor and its drive method according to the present invention, it is preferable that a signal-holding operation is performed in which the plurality of memory sections are cyclically used so that, after the signals are held in all the memory sections corresponding to the pixels, the memory section holding the oldest signal is reset to hold a new signal, and the operation of holding a new signal in the memory section is halted in response to a halt instruction. It is recommendable that the actual halting of the operation of holding a new signal in the memory section can be appropriately delayed from the point in time of the halt instruction, in which case it is preferable that the delay time or the number of frames can be externally set.

According to this method, it is possible, in the second drive mode, to repeat a high-speed imaging operation without reading pixel signals to the outside of the sensor and, for example, obtain images before and after a point in time where a trigger signal has been externally provided. Therefore, at the moment of occurrence of a certain situation, such as a change in an object, it is possible to obtain images not only after that moment but also before that moment.

As an example of usage of the first drive mode and the second drive mode, it is possible to detect a specific event based on the image information derived from a portion or entirety of one or more frames of images produced by performing the first drive mode, and to perform the second drive mode according to the detection result. This can be interpreted as the trigger signal being generated by the detection of a specific event.

By this method, it is possible, for example, to take accurate images of a rapidly changing object immediately after a certain sign of change in the object is recognized.

In the solid-state image sensor and its drive method according to the present invention, it is also possible to alternately perform the first drive mode and the second drive mode an arbitrary number of times or at arbitrary intervals of time.

According to this method, when a certain change in an object is recognized based on the pixel signals read in the first drive mode, the memory sections still hold the signals obtained in the preceding cycle of the second drive mode. By reading these signals, it is possible to obtain images that temporally precede the detection of the change in the object.

In one possible variation of the solid-state image sensor and its drive method according to the present invention, a portion of the memory sections for the second drive mode can be utilized during an operation in the first drive mode.

By this method, the memory sections available can be entirely used in the second drive mode, which accordingly increases the possible number of frames for continuous imaging.

In another possible variation of the solid-state image sensor and its drive method according to the present invention, the memory sections for the first drive mode and those for the second drive mode are independent of each other.

In the solid-state image sensor and its drive method according to the present invention, it is also possible that, when the signals are sequentially read from the memory section, a set of signals corresponding to specific pixels among the plurality of pixels arranged in the two-dimensionally array are selectively and sequentially read and outputted.

Specifically, for example, it is preferable to appropriately thin out (or skip) signals by reading them from every second or third pixel in the horizontal and/or vertical direction among the two-dimensional array of pixels. Although this operation lowers the image resolution, the lowered resolution is often sufficient for a rough observation of an object. In such a case, the frame rate of imaging in the first drive mode can be increased by reducing the number of signals to be read. If it is previously known that a change in an object will occur only within a specific portion of the entire image rather than its entirety, it is possible to read image signals only from that portion. In this case, the frame rate can be increased without lowering the image resolution.

In the solid-state image sensor and its drive method according to the present invention, it is also possible that the signals corresponding to neighboring or adjacent pixels among the plurality of pixels arranged in a two-dimensional array are simultaneously read from the memory sections and subjected to an analogue adding or averaging operation.

For example, in a system where signals are selectively extracted from capacitors into a common output line by on/off operations of a switch (transistor) in each memory section, it is possible to add signals together in analogue form on the output line by simultaneously turning on a plurality of switches to extract signals from a plurality of capacitors. By this method, a higher S/N ratio can be achieved than in the previously described thin-out reading operation since, as opposed to the thin-out reading operation, no signal is wasted. In the previous variation, an important change in an object cannot be detected if it occurs in a thin-out portion. In the present variation, on the other hand, such a change is also reflected, so that a change in an object is easier to be assuredly detected.

In this case, the combination of a plurality of pixels to be involved in the analogue adding or averaging operation may be selected alternately in the horizontal and vertical directions among the two-dimensionally arrayed pixels. This makes the reduction in the resolution less noticeable to the eyes than when the method is not used.

In the solid-state image sensor and its drive method according to the present invention, it is also possible that the signals corresponding to one or more pixels at the same spatial location but in different frames that are temporally next to or close to each other are read from the memory sections and subjected to an analogue adding or averaging operation.

EFFECT OF THE INVENTION

The solid-state image sensor and its drive method according to the present invention makes it possible to perform both an ultrahigh-speed imaging operation (e.g. at one million frames per second or higher) and a rather slow but long-time imaging operation by a single sensor. Thus, one can provide an imaging device that is relatively inexpensive yet widely applicable or highly usable.

By appropriately using the first drive mode and the second drive mode according to the case, it is possible to detect, for example, a change in an object or a phenomenon under observation as soon as the change or phenomenon occurs, and perform high-speed imaging after that point in time or before and after that point in time. This eliminates the necessity of generating a detection signal by another sensor (e.g. a vibration sensor) or taking images by another imaging device in order to generate a trigger signal for initiating or halting the high-speed imaging, thus reducing the cost of high-speed imaging systems. The present system can assuredly detect an object of interest and record its images even if the object may make a change that cannot be captured by a vibration sensor or other sensors or if the observing condition prevents installation of such sensors.

BRIEF DESCRIPTION OF THE DRAWINGS

FIG. 11 is a block diagram showing a schematic configuration for reading signals held in the memory sections through output lines in the solid-state image sensor of the present embodiment.

FIG. 12 is a schematic time chart of a continuous reading mode and burst reading mode in the solid-state image sensor of the present embodiment.

EXPLANATION OF NUMERALS

1 . . . Semiconductor Substrate
2, 2a, 2b . . . Pixel Area
3a, 3b . . . Memory Area
4a, 4b . . . Vertical Scan Circuit Area
5a, 5b . . . Horizontal Scan Circuit Area
6a, 6b . . . Current Source Area
10 . . . Pixel
11 . . . Photoelectric Conversion Area
12 . . . Pixel Circuit Area
13 . . . Wiring Area
14, 141 . . . Pixel Output Line
15 . . . Drive Line
20 . . . Memory Section Unit
21 . . . Row of Memory Section Unit
22 . . . Memory Section
23, 23a, 23b, 23c, 23d . . . Output Line
24, 24a, 24b, 24c, 24d . . . Memory Element
25, 25a, 25b, 25c, 25d . . . Capacitor
26, 26a, 26b, 26c, 26d . . . Sampling Transistor
27, 27a, 27b, 27c, 27d . . . Reading Transistor
31 . . . Photodiode
32 . . . Transfer Transistor
33, 331, 332 . . . Floating Diffusion
333 . . . Metallic Wiring
34 . . . Storage Transistor
35 . . . Reset Transistor
36 . . . Storage Capacitor
37, 40 . . . Transistor
38, 41 . . . Selection Transistor
39 . . . Current Source
43 . . . Source Follower Amplifier
50 . . . Memory Section Unit Block
VSR1 . . . Vertical Shift Register
HSR1 . . . Horizontal Shift Register

BEST MODE FOR CARRYING OUT THE INVENTION

A solid-state image sensor and its drive method which is an embodiment of the present invention is hereinafter described with reference to the drawings.

Figure 1:
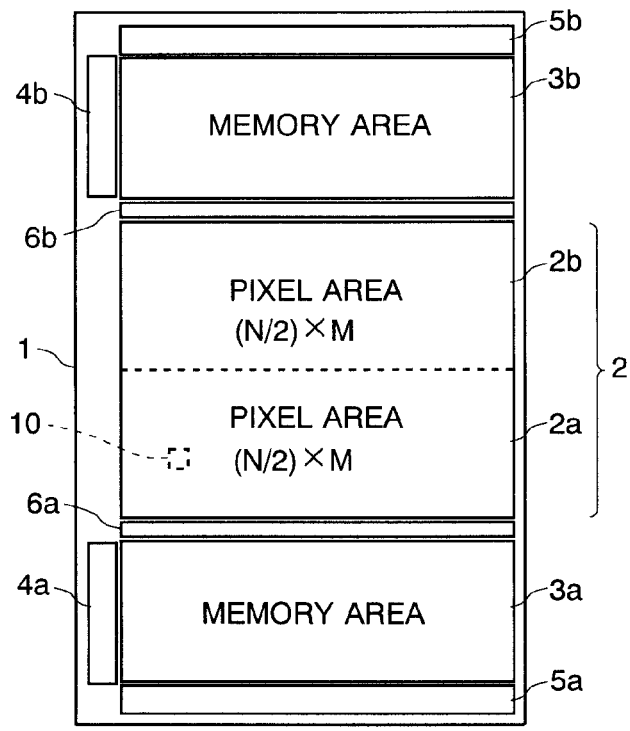
FIG. 1 is a schematic plan view showing the layout on a semiconductor chip of a solid-state image sensor which is an embodiment of the present invention.
Figure 3:
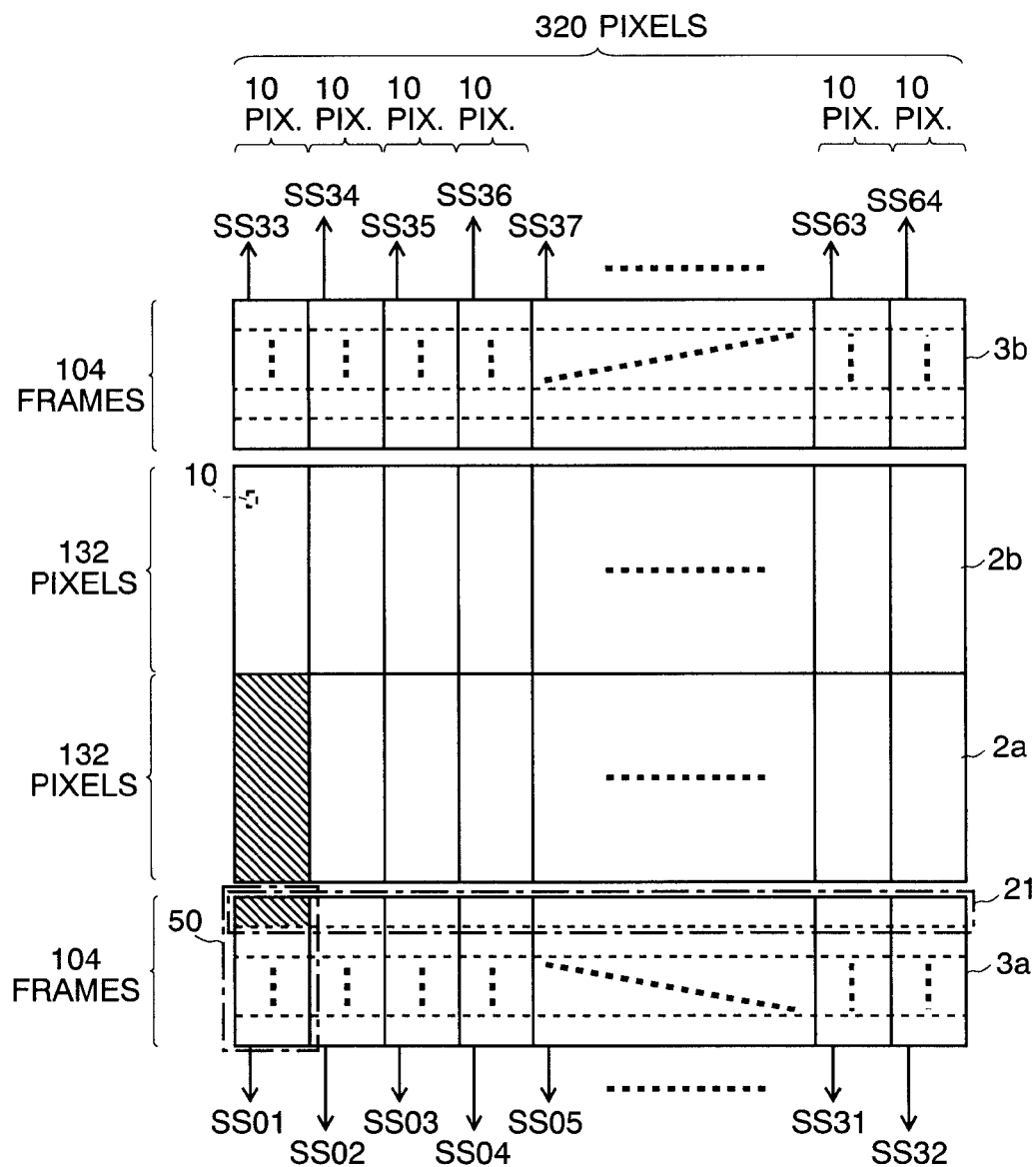
FIG. 3 is a plan view showing a schematic configuration of the pixel area and memory area in the solid-state image sensor of the present embodiment.
Figure 4:
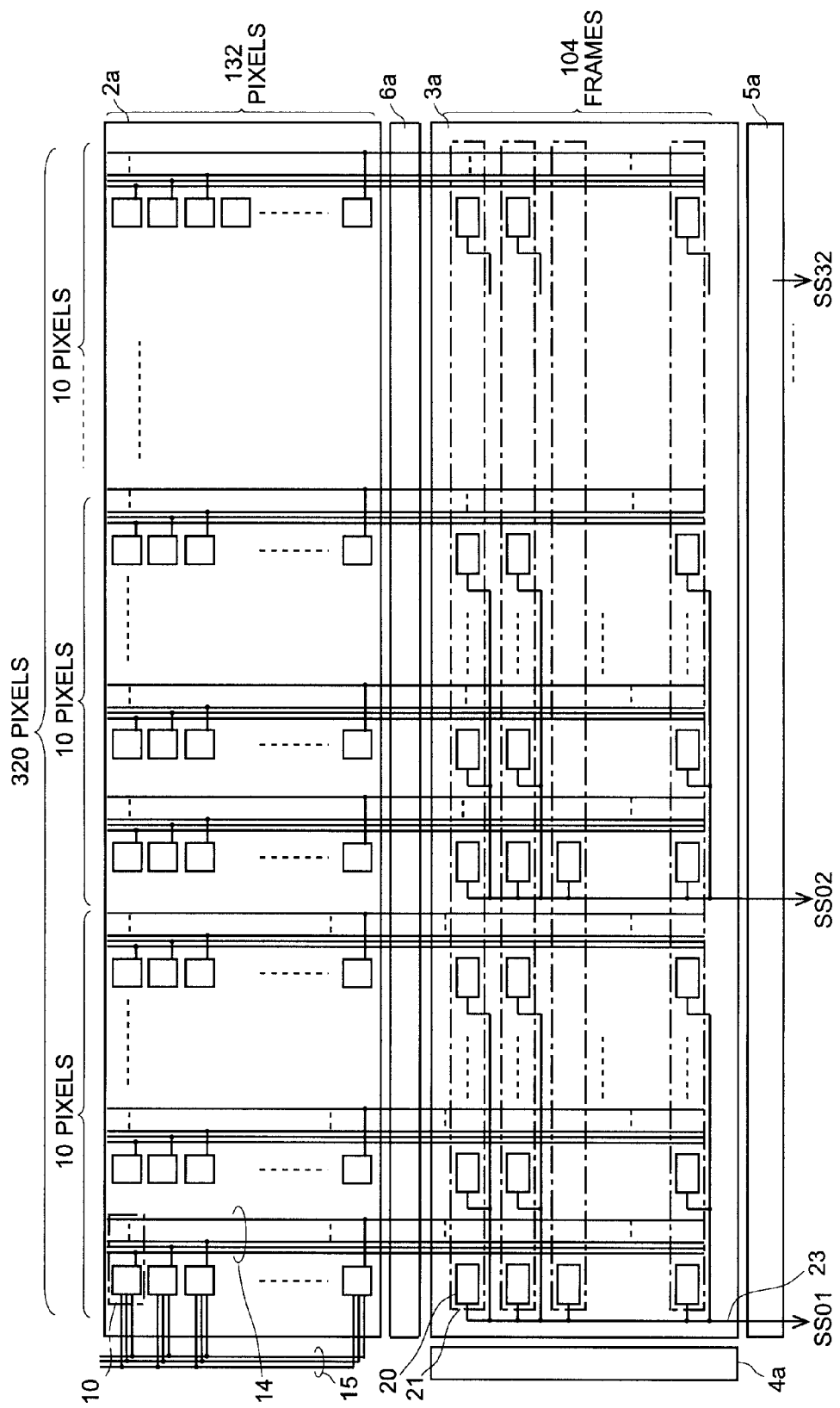
FIG. 4 is a block diagram of the main portion corresponding to approximately one half of the semiconductor chip of the solid-state image sensor of the present embodiment.

An overall configuration and structure of the solid-state image sensor according to the present embodiment is initially described. FIG. 1 is a schematic plan view showing the layout on a semiconductor chip of the solid-state image sensor of the present embodiment, FIG. 3 is a plan view showing a schematic configuration of the pixel area and memory area in the solid-state image sensor of the present embodiment, and FIG. 4 is a block diagram of the main portion corresponding to approximately one-half of the semiconductor chip of the solid-state image sensor of the present embodiment.

As shown in FIG. 1, in the present solid-state image sensor, the pixel area 2 (2a and 2b) for receiving light and producing signals for each pixel and the memory areas 3a and 3b for holding the signals for a predetermined number of frames are not intermixed but completely separated from each other on the semiconductor substrate 1 so that each area forms a definite block. Within the rectangular pixel area 2, a total of N×M pixels 10 consisting of N rows and M columns are arranged in a two-dimensional array. This pixel area 2 is divided into the first pixel area 2a and second pixel area 2b, each of which has (N/2)×M pixels arranged inside.

Below the first pixel area 2a, a first memory area 3a is provided across a first current source area 6a having a small area, while a second memory area 3b is provided above the second pixel area 2b across a second current source 6b which also has a small area. The first and second memory areas 3a and 3b each include a first or second vertical scan circuit area 4a or 4b and a first or second horizontal scan circuit area 5a or 5b, each circuit area being provided with circuits such as shift resisters and decoders for controlling the reading of signals from the memory area 3a or 3b. As shown in FIG. 3, each memory area 3a or 3b has 64 bundles of output lines SS01-SS64, including 32 bundles at each of the upper and lower ends, for reading signals to the outside of the sensor.

The solid-state image sensor of the present embodiment is nearly symmetrical with respect to a horizontal border line extending approximately through the center of the pixel area 2 to divide this area into upper and lower sections. The structure and operation of the upper and lower sections are basically identical. Therefore, the following description is mainly concerned with the structure and operation of the lower section, i.e. the first pixel area 2a, first memory area 3a, first vertical scan circuit area 4a and first horizontal scan circuit area 5a.

The number of pixels, i.e. the values of N and M, can be arbitrarily determined. Increasing these values improves the image resolution but also unfavorably results in either an increase in the entire chip area or a decrease in the chip area per one pixel. In the present example, N=264 and M=320. Accordingly, the number of pixels arranged in each of the first and second pixel areas 2a and 2b is 42240, i.e. 320 pixels in the horizontal direction and 132 pixels in the vertical direction, as shown in FIGS. 3 and 4.

Figure 2:
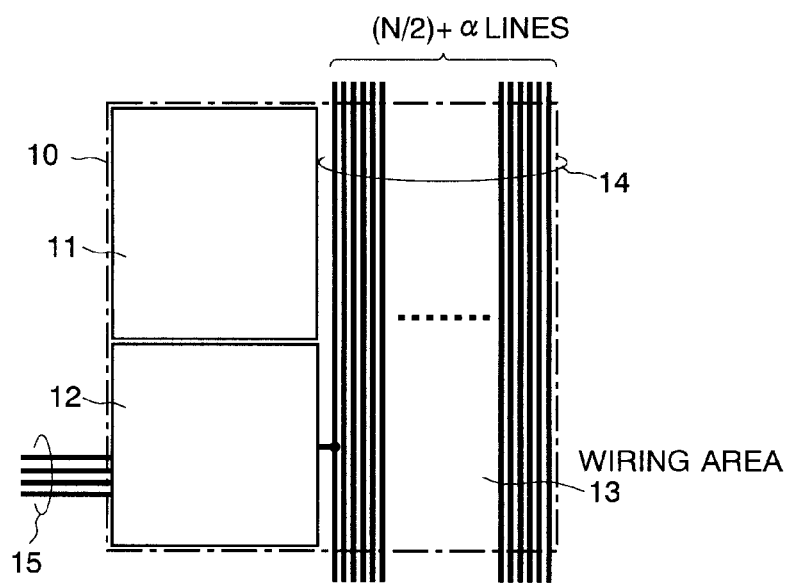
FIG. 2 is a schematic plan view showing the layout of one pixel within a pixel area in the solid-state image sensor of the present embodiment.

FIG. 2 is a plan view showing the schematic layout of one pixel 10 within the pixel area 2 (2a and 2b). One pixel 10 occupies roughly one square area, which is further divided into three areas, i.e. the photoelectric conversion area 11, pixel circuit area 12 and wiring area 13. In the wiring area 13, a bundle of vertically extending (M/2)+α pixel output lines 14 are provided. The value of α may be zero, in which case the number of pixel output lines passing through one wiring area 13 in the present example is 132. However, when a large number of wirings (e.g. aluminum wirings or other kinds of metal wirings) parallel to each other are created, the width of the wires on both ends as well as their parasitic capacitances normally tend to be different. To address these problems, a dummy wire is additionally provided at each end of the 132 pixel output lines which are used to actually pass the signals. In this case, α=2, so that the number of wires passing through one wiring area 13 is 134.

Figure 5:
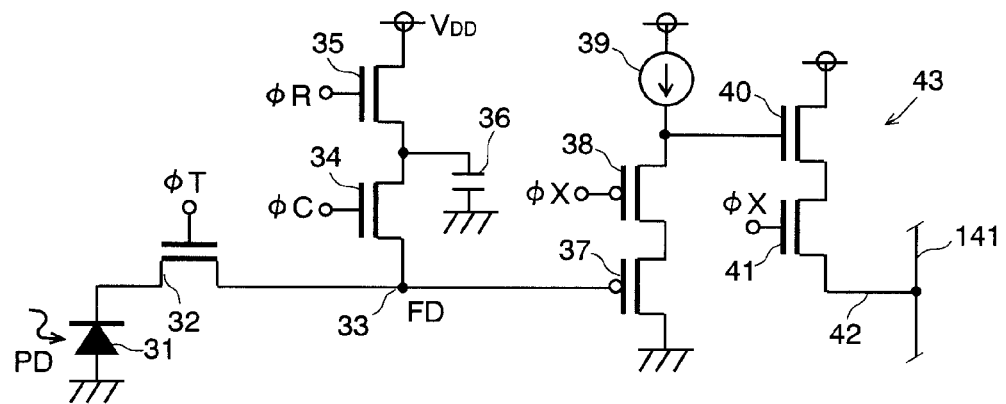
FIG. 5 is a circuit configuration diagram of one pixel in the solid-state image sensor of the present embodiment.

FIG. 5 is a circuit configuration diagram of one pixel 10 shown in FIG. 2. The pixel 10 includes the following elements: a photodiode 31 for receiving light and producing photocharges (this element corresponds to the photoelectric conversion element in the present invention); a transfer transistor 32, which is located near the photodiode 31, for transferring the photocharges (this element corresponds to the transfer element in the present invention); a floating diffusion (FD) 33, which is connected to the photodiode 31 via the transfer transistor 32, for temporarily storing the photocharges (this element corresponds to the detection node in the present invention); a storage transistor 34 and storage capacitor 36 for storing charges overflowing from the photodiode 31 through the transfer transistor 32 in the process of storing photocharges (these elements correspond to the charge storage element in the present invention); a reset transistor 35 for discharging the charges stored in the floating diffusion 33 and the storage capacitor 36; a source follower amplifier 43 with a two-stage configuration including a pair of cascade-connected PMOS transistors 37 and 38 and another pair of cascade-connected NMOS transistors 40 and 41, for extracting charges stored in the floating diffusion 33 or in both the floating diffusion 33 and the storage capacitor 36 to the outside as voltage signals (this amplifier corresponds to the buffer element in the present invention); and a current source 39, which consists of a constant-current transistor and other components, for supplying current to the transistors 37 and 38 in the first stage of the source follower amplifier 43.

Drive lines 15 for supplying control signals φT, φC, φR and φX are respectively connected to the gate terminals of the transfer transistor 32, storage transistor 34, reset transistor 35, and selection transistors 38 and 41 of the source follower amplifier 43. As shown in FIG. 4, these drive lines are common to all the pixels within the pixel area 2. This configuration enables simultaneous driving at all the pixels.

The output 42 of the low-voltage side transistor 41 in the second stage of the source follower amplifier 43 is connected to one of the 132 pixel output lines 14 (i.e. the pixel output line denoted by numeral 141 in FIG. 5) provided in the aforementioned wiring area 13. Such a pixel output line 141 is provided for every pixel 10, i.e. independently for each pixel 10. Therefore, the present solid-state image sensor has as many pixel output lines as the number of pixels, i.e. 84480.

The source follower amplifier 43 functions as a current buffer for driving the pixel output line 141 at high speeds. As shown in FIG. 4, each pixel output line 141 extends from the pixel area 2a to the memory area 3a and hence acts as a considerably large capacitive load. Driving such an element at high speeds requires a large-sized transistor through which high currents can be passed. However, in order to raise the gain of photoelectric conversion to enhance the detection sensitivity in the pixel 10, the floating diffusion 33 for converting photocharges to voltage should preferably have the smallest possible capacitance. The parasitic capacitance of the gate terminal of the transistor connected to the floating diffusion 33 causes an effective increase in the capacitance of the floating diffusion 33. Therefore, for the aforementioned reason, this transistor 37 should preferably be a small-sized transistor with a small gate input capacitance. To fulfill both the supply of high current on the output side and the low capacitance on the input side, the source follower amplifier 43 in the present embodiment has a two-stage configuration, where a small-sized transistor is used as the transistor 37 in the first stage to reduce the input gate capacitance while large-sized transistors are used as the second-stage transistors 40 and 41 to ensure a high output current.

The selection transistor 38 in the first stage of the source follower amplifier 43 is not essential for the basic operation. However, when the second-stage selection transistor 41 is off, this selection transistor 38 can be simultaneously turned off to block the flow of current from the current source 39 into the transistor 37 and thereby suppress the consumption of electric power.

Figure 6:
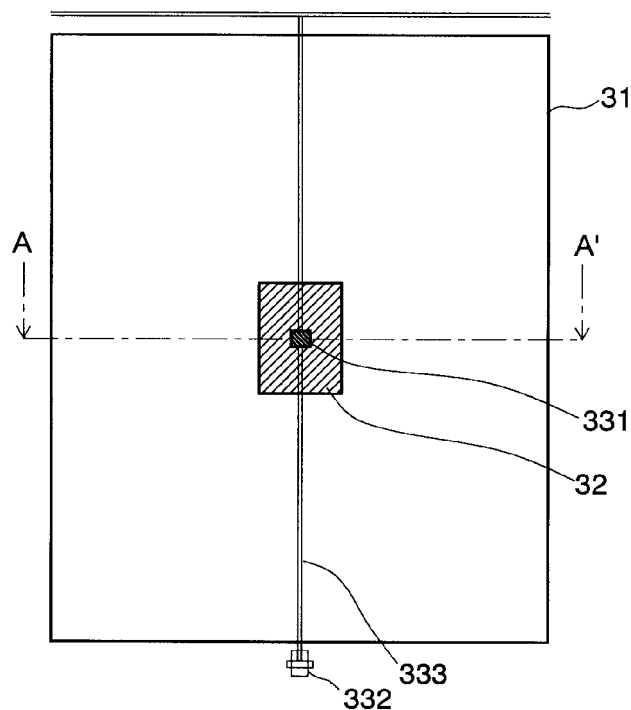
FIG. 6 is a schematic plan view showing the layout of a photoelectric conversion area in one pixel in the solid-state image sensor of the present embodiment.
Figure 7:
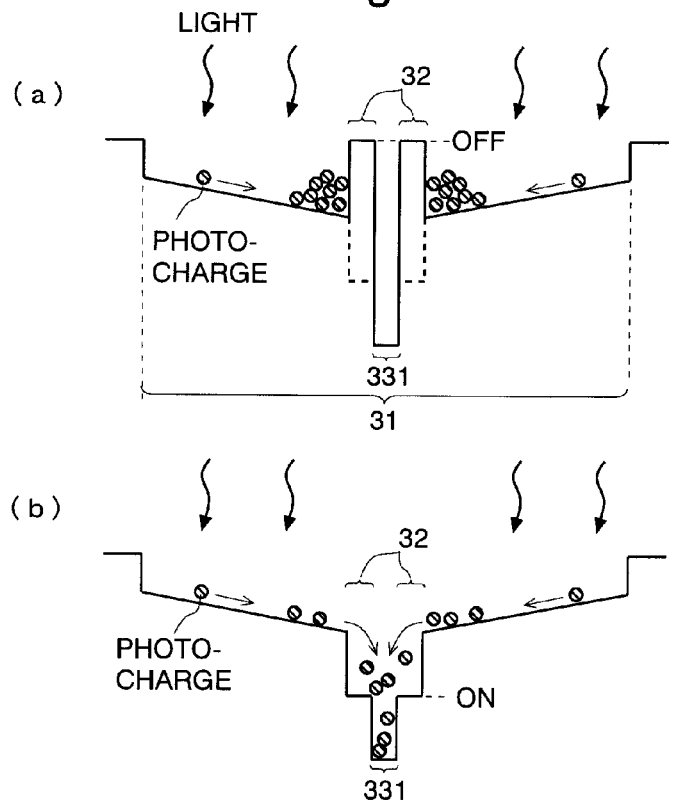
FIG. 7 is a schematic potential diagram at the vertical section indicated by the arrowed line A-A' in FIG. 6.

FIG. 6 is a schematic plan view showing the layout of the photoelectric conversion area 11 in one pixel 10, and FIG. 7 is a schematic potential diagram at the vertical section indicated by the arrowed line A-A' in FIG. 6.

The photodiode 31, which has a photo-receiving surface that is substantially rectangular when viewed from above, has an embedded photodiode structure. In high-speed imaging, the exposure time is extremely short. Therefore, to ensure appropriate exposure, the photodiode of each pixel 10 needs to have the largest possible photo-receiving surface so that it can receive the largest possible amount of incident light. However, increasing the area of the photo-receiving surface of the photodiode normally causes a problem relating to the time required for the photocharges to reach the floating diffusion, i.e. the detection node, particularly for the photocharges produced in the circumferential portion of the photo-receiving surface. This problem can result in a situation where the photocharges that cannot be transferred during the short cyclic period of the high-speed imaging are eventually wasted or cause afterimages. To address these problems, the solid-state image sensor of the present embodiment has adopted a special structure, as hereafter described, to improve the charge-transfer speed.

The floating diffusion is normally placed next to the photodiode. However, as shown in FIG. 6, the present solid-state image sensor has a small-sized floating diffusion 331 located nearly at the center of the photodiode 31, with the ring-shaped gate of the transfer transistor 32 encircling the floating diffusion 331. Placing the floating diffusion 331 at the center of the photodiode 31 in this manner reduces, on average, the moving distance of the photocharges from the circumferential portion of the photodiode 31 to the floating diffusion 331. Accordingly, the photocharges can easily reach the floating diffusion 331 irrespective of where they are generated within the circumferential portion of the photodiode 31.

Furthermore, in the process of creating the photodiode 31, the amount (or depth) of injection (doping) of impurities is changed in stages by using a plurality of photomasks to provide a gradient or stepwise change in the amount of doping (or injection depth) of the impurities from the circumference of the photodiode 31 toward its center (i.e. the floating diffusion 331). Therefore, when an appropriate bias voltage is applied to the PN junction of the photodiode 31, a potential gradient that declines from the circumference of the photodiode 31 toward its center is created, as shown in FIG. 7(a). Due to this intended potential gradient created by a skillfully devised process, a photocharge produced by incident light at a location closer to the circumference of the photodiode 31 is more rapidly accelerated toward the center.

In this process, when the transfer transistor 32 is off, the photocharges are collected around the potential barrier formed immediately below the ring-shaped gate of the transfer transistor 32, as shown in FIG. 7(a). Then, when the transfer transistor 32 is turned on, the collected photocharges will immediately fall into the floating diffusion 331 through the transfer transistor 32, as shown in FIG. 7(b). On the other hand, if the transfer transistor 32 is maintained in the ON state while the light is being received, the photocharges that have gathered at the center along the potential gradient will directly fall into the floating diffusion 331 through the transfer transistor 32. In any of these cases, the photocharges produced by the photodiode 31 are promptly, and with high probability, transferred to the floating diffusion 331.

The provision of the floating diffusion 331 at the center of the photodiode 31 offers the previously described significant advantages. However, the previous configuration causes the problem that the aperture ratio will decrease if another element, such as a storage capacitor 36 for storing photocharges that have overflowed, is placed close to the floating diffusion 331. This problem is avoided in the present embodiment by providing a second floating diffusion 332 as a diffusion layer within the pixel circuit area 12 in addition to the aforementioned floating diffusion 331 which photocharges directly flow into as described previously (this floating diffusion is hereinafter called the first floating diffusion), with a wire 333 made of aluminum or other kinds of metal connecting the first floating diffusion 331 and the second floating diffusion 332 to equalize their potential. This means that the first floating diffusion 331 and the second floating diffusion 332 integrally function as a floating diffusion 33 which serves as the detection node for converting electric charge signals into voltage signals.

The internal configuration of the first and second memory areas 3a and 3b is hereinafter described in detail. As shown in FIG. 4, each of the first and second memory areas 3a and 3b includes memory section units 20 whose number equals the number L of storage frames. These memory section units 20 are arrayed in the extending direction of the 132 pixel output lines 14 which are respectively connected to the 132 pixels 10 vertically arranged within the pixel area 2a or 2b. In the present example, the number L of storage frames, or the number of frames for continuous imaging, is 104. Accordingly, 104 pieces of memory section units 20 are vertically arranged to form a column, and 320 copies of this column are arranged horizontally. Thus, the first memory area 3a has 104×320=33280 pieces of memory section units 20 arranged inside. The second memory area 3b also has the same number of memory section units 20.

Figure 8:
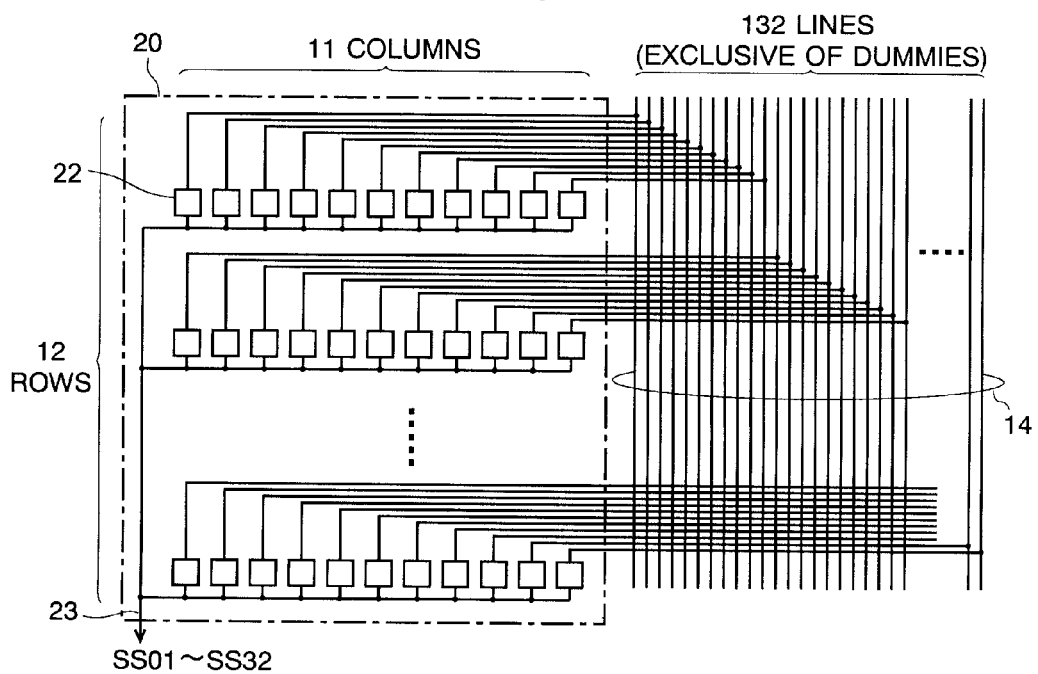
FIG. 8 is a schematic configuration diagram of one memory section unit corresponding to 132 pixels vertically arranged in the solid-state image sensor of the present embodiment.

FIG. 8 is a schematic diagram showing the internal configuration of one memory section unit 20. Each memory section unit 20 includes a total of 132 memory sections 22 forming an array with 12 rows and 11 columns. Each memory section 20 is connected to a different pixel output line 141. The pixel output lines 141 establish a one-to-one relation between the memory sections 22 and the pixels 10 within the pixel area 2a. The 132 memory sections 22 within one memory section unit 20 hold signals received from the 132 pixels forming one column within the pixel area 2a. Therefore, the 320 memory section units 20 forming one horizontal row in FIG. 4 (i.e. the row of memory section units denoted by numeral 21 in FIG. 4) hold the pixel signals of the lower half of one frame consisting of 132×320 pixels. Similarly, in the second memory area 3b located above in FIG. 3, the pixel signals of the upper half of one frame consisting of 132×320 pixels are held by 320 memory section units 20 forming one horizontal row. Combining those two sets of signals produces one frame of image. With the vertically arranged 104 rows of memory section units, the present device can hold 104 frames of pixels signals.

As shown in FIG. 8, all outputs of the 132 memory sections 22 in each memory section unit 20 are connected together to form a single output line 23. Furthermore, as shown in FIG. 4, the horizontally arranged memory section units 20 are divided into groups each consisting of ten neighboring memory section units 20. Thus, 32 groups of memory section units 20 are horizontally arranged, where the output lines 23 of the ten memory section units 20 in each group are connected together to form a single line. The output lines 23 of the vertically arranged 104 memory section units 20 are also connected together to form a single line. As a result, the outputs of 1040 memory section units 20 arrayed in 10 columns and 104 rows, or the outputs of 137280 memory sections 22 included in those memory section units 20, are connected together to form one output line 23 in the memory area 3a. In FIG. 3, a memory section unit block, which is a collection of the memory section units 20 sharing the same output line 23, is denoted by numeral 50. The configuration described to this point results in 32 output lines 23 extracted from the first memory area 3a and the same number of output lines 23 extracted from the second memory area 3b. The signals extracted through these output lines 23 are denoted by numerals SS01-SS64.

Figure 9:
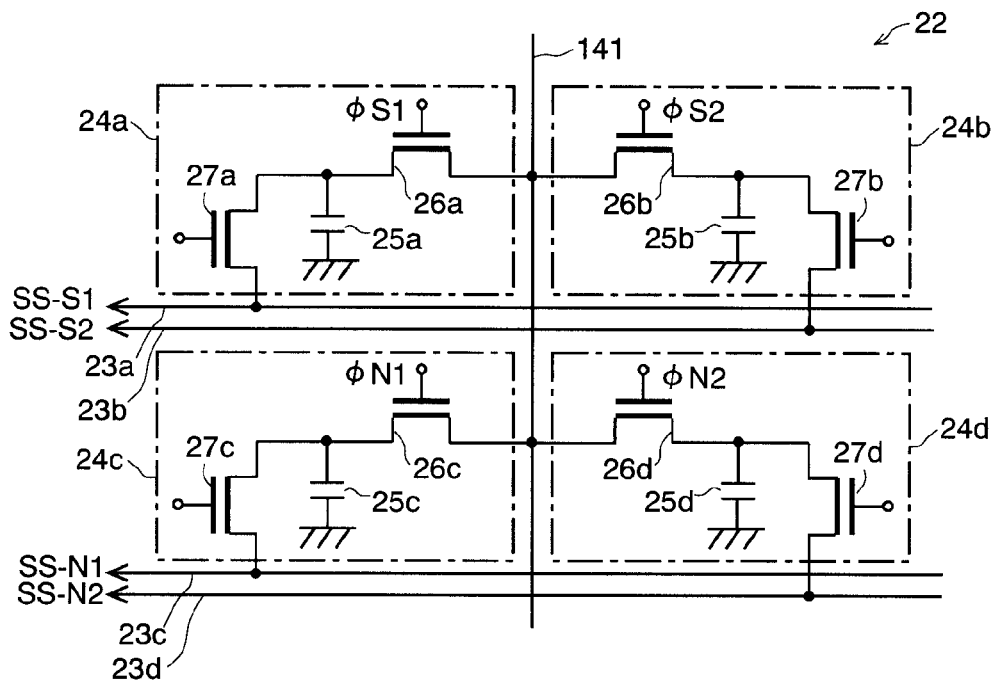
FIG. 9 is a circuit configuration diagram of one memory section in the solid-state image sensor of the present embodiment.
Figure 10:
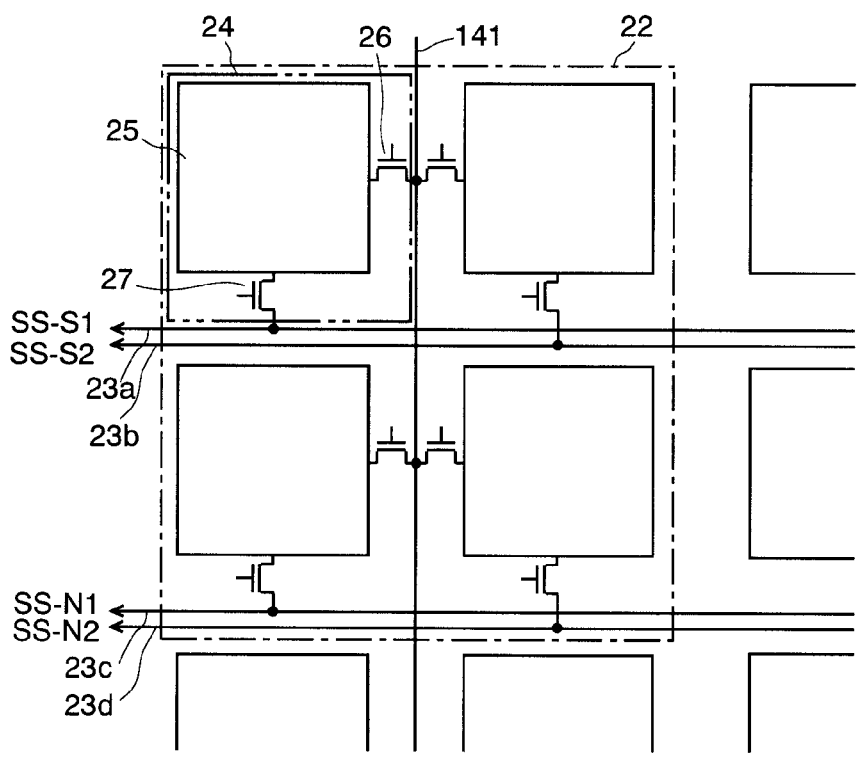
FIG. 10 is a schematic plan view showing the layout of one memory section in the solid-state image sensor of the present embodiment.

FIG. 9 is a circuit diagram of one memory section 22, and FIG. 10 is a schematic plan view showing the layout of one memory section 22. One memory section 22 has four memory units. Each memory element 24 (24a-24d), which serves as a memory unit, is composed of a sampling transistor 26 (26a-26d) connected to one pixel output line 141, a capacitor 25 (25a-25d) connected via the sampling transistor 26 to the pixel output line 141, and a reading transistor 27 (27a-27d) for reading an analogue voltage signal held in the capacitor 25. One memory section 22 consists of the combination of these four memory elements 24 (24a-24d). Accordingly, each memory section 22 can hold four different analogue voltage signals extracted from the same pixel through the same pixel output line 141. The output lines 23a-23d via the four reading transistors 27a-27d are independent of each other. This means that the output line 23 shown in FIGS. 3, 4 and 8 actually consists of four lines, which are separately extracted for output. Alternatively, it is possible to perform an analogue process, such as differencing, inside the sensor and extract the resultant signal through a single output line 23 to the outside of the sensor.

The original purpose of building each memory section 22 from four memory elements 24a-24d is to independently hold a signal corresponding to the charge before an overflow, a signal corresponding to the charge after an overflow, a noise signal contained in the signal corresponding to the charge before an overflow and a noise signal contained in the signal corresponding to the charge after an overflow, in order to perform a dynamic range increasing process and noise removing process, which will be described later. However, it is not always necessary to persist on this purpose; the memory elements 24a-24d can also be used in other operational modes. For example, if the storage capacitor 36 of each pixel 10 is not used, there is no need to consider the signal corresponding to the charge after an overflow and the noise signal contained in the signal corresponding to the charge after an overflow, in which case the corresponding memory elements 24 can be used to increase the number of frames for continuous imaging. As a result, the possible number of frames for continuous imaging will be doubled to 208. If the noise removal is also unnecessary, the possible number of frames for continuous imaging will be further doubled to 416.

Similar to the storage capacitor 36 in the pixel 10, the capacitors 25a-25d can be created, for example, by a double polysilicon gate structure or stack structure. Using a CCD structure to hold electric charges would cause the problem that an aliasing due to dark charges caused by thermal excitation or other factors would be added to the photo signal. The capacitors 25a-25d in the form of a double polysilicon gate structure or stack structure cause no such dark charges and hence no addition of aliasing, thus improving the S/N ratio of the signals to be extracted to the outside.

FIG. 11 is a block diagram showing a schematic configuration for reading signals held in the memory sections within the memory area 3a through the previously described output line 23. There are horizontal shift registers HSR1-HSR320 provided for each vertical column of the memory section units 20 (20-01 to 20-10) arranged in a two-dimensional array, and vertical shift registers VSR1-VSR104 provided for each horizontal row. In a sequential reading, one memory section unit 20 is selected by a combination of the horizontal shift registers HSR1-HSR320 and vertical shift registers VSR1-VSR104. Within the selected memory section unit 20, the memory sections 22 are sequentially selected to extract pixel signals one after another. It should be noted that understanding the reading operation requires considering only the operation inside one memory section unit block 50 since different memory section unit blocks 50 having separate output lines 23 can be concurrently operated.

The drive methods and operations of the solid-state image sensor of the present embodiment are hereinafter described. The solid-state image sensor of the present embodiment has two major drive modes, i.e. the continuous reading mode and burst reading mode. The continuous reading mode corresponds to the first drive mode in the present invention, and the burst reading mode corresponds to the second drive mode. The following description initially explains schematic operations of these two drive modes with reference to FIG. 12. FIG. 12 is a schematic time chart of the continuous reading mode and burst reading mode.

(A) Continuous Reading Mode

The basic form of the continuous reading mode is as shown in FIG. 12(a): After the photocharges for one frame are stored in the pixels within the pixel areas 2 (2a and 2b), the signals are collectively read at all the pixels through the corresponding pixel output lines, and then these signal charges are held by the capacitors 25 of the memory sections 22. Thus, the pixel signals for one frame are completely arranged in the memory sections 22 of the memory areas 3a and 3b. Subsequently, the horizontal shift registers and vertical shift registers are driven in the previously described manner to sequentially read one frame of pixel signals and extract them to the outside. This process uses only the 320 memory section units 20 belonging to the topmost row within the memory area 3a.

If the frequency of the clock signal for driving the horizontal and vertical shift registers is 50 MHz, the reading time for one pixel signal is 0.02 μsec. The topmost row of one memory section unit block 50 has 132×10=1320 memory sections 22, for which the reading time amounts to 26.4 μsec. As described previously, the reading operation can be simultaneously performed at different memory section unit blocks 50. Therefore, the process of reading one frame of pixel signals can be completed in 26.4 μsec. This also means that the photocharge storage time can be extended to this period of time, thus offering a greater degree of freedom of setting the photocharge storage time as compared to the burst reading mode, which will be described later.

The example of FIG. 12(a) is concerned with only one frame. However, since the pixel areas 2a and 2b and the memory areas 3a and 3b can be independently operated except when signals are transferred between them through the pixel output lines 14, the storage of photocharges in the pixel areas 2a and 2b can be performed simultaneously with the sequential reading of pixel signals from the memory areas 3a and 3b. Accordingly, as shown in FIG. 12(b), it is possible to almost continuously repeat the imaging operation.

(B) In the Case of Burst Reading Mode

In the burst reading mode, as shown in FIG. 12(c), the following process is repeated: After the photocharges for one frame are stored in each pixel without performing sequential reading of the pixel signals, the signals are collectively read at all the pixels through the corresponding pixel output lines, and then the signal charges are held by the capacitors 25 of the memory sections 22. In this step, the signals are sequentially stored, one frame after another, into the memory sections 22 prepared for 104 frames. Then, these pixel signals corresponding to the predetermined number of frames are sequentially read and outputted to the outside. The burst reading mode does not include the step of reading signals to the outside during the imaging operation and hence is free from the limitation on the frame rate due to the upper limit of the clock frequency for the reading operation. Therefore, it is possible to continuously take images at extremely short intervals of time. The practically achievable maximum frame rate is mainly limited by the time required for the photocharges produced in the photodiode 31 to be collected and transferred to the floating diffusion 33. As already explained, the structure of the photodiode 31 and other features of the solid-state image sensor in the present embodiment are designed to deal with a possible decrease in the amount of light during the storage of photocharges. Therefore, it is possible to perform high-speed imaging at frame rates higher than one million frames per second, i.e. a level that has been practically achieved by conventional in-situ storage image sensors.

A detailed method of driving the solid-state image sensor of the present invention is hereinafter described, where the process from the photoelectric conversion in each pixel 10 through the storage of the resultant signal in one memory section 22 is initially described with reference to FIGS. 13 to 16.

The solid-state image sensor of the present invention offers two different options for the drive mode: one drive mode is for a short photocharge storage time and the other for a relatively long photocharge storage time. As a rough guide, the former mode is suitable for a photocharge storage time shorter than a range from 10 to 100 μsec. This drive mode can be preferably used when the imaging is performed at a high rate of one million frames per second or higher, which normally means that a burst reading mode is performed.

(A) Drive Mode for Short Photocharge Storage Time

Figure 13:
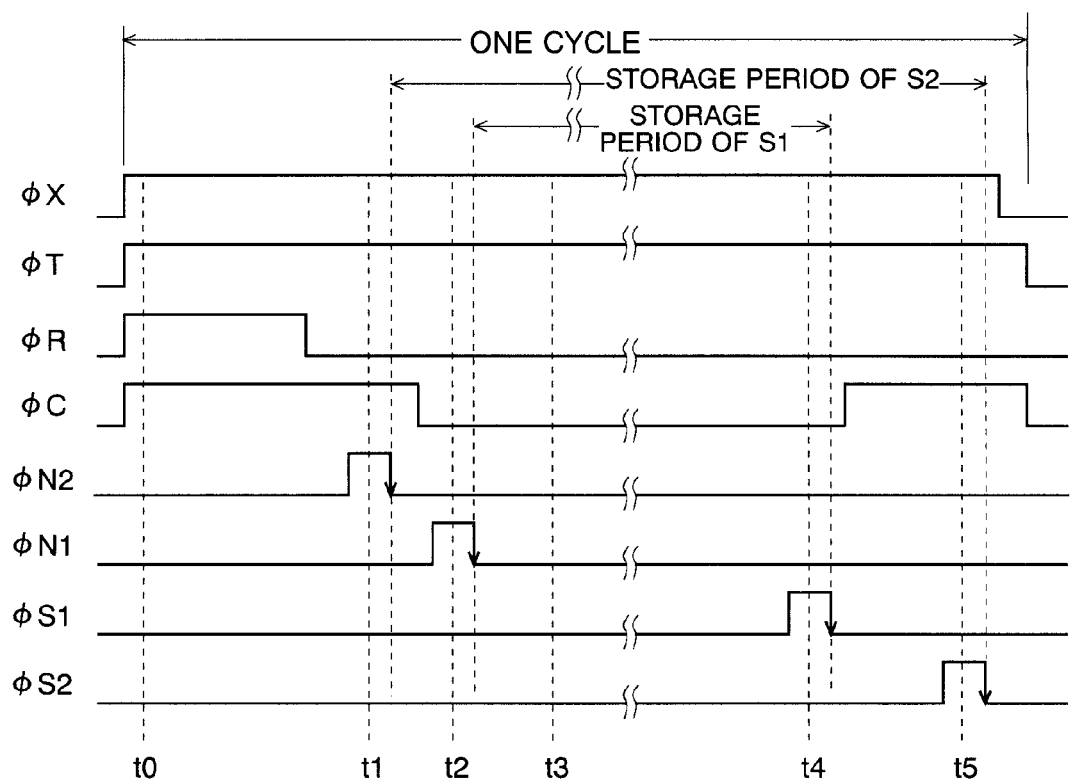
FIG. 13 is a drive timing chart of an operation mode of the solid-state image sensor of the present embodiment in the case where the photocharge storage time is short.
Figure 14:
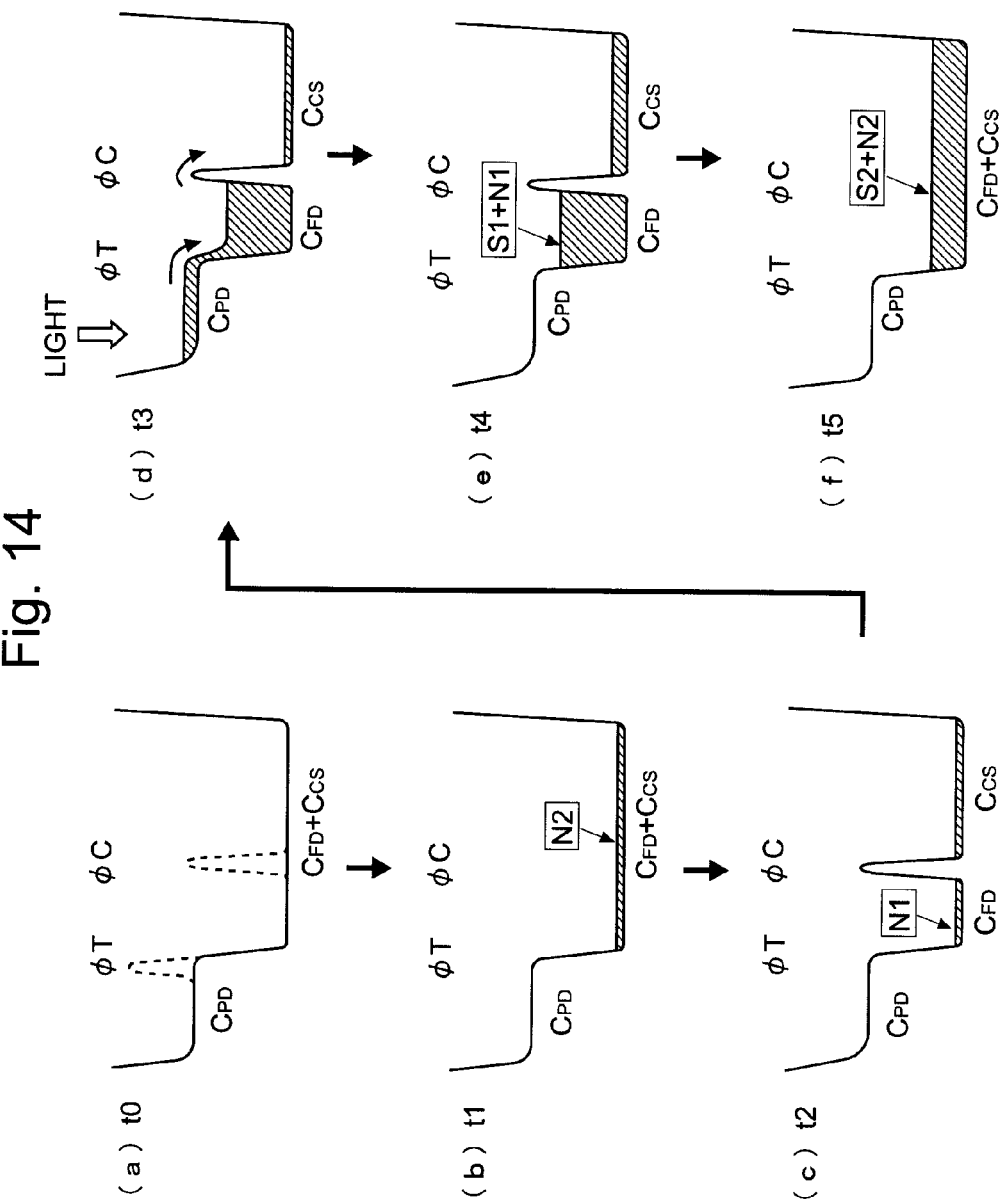
FIG. 14 is a schematic potential diagram inside a pixel during the operation shown in FIG. 13.

FIG. 13 is a drive timing chart of the operation mode for a short photocharge storage time, and FIG. 14 is a schematic potential diagram inside the pixel 10 during this drive mode. In FIG. 14 (and in FIG. 16 to be mentioned), $C_{PD}$, $C_{FD}$ and $C_{CS}$ denote the capacitances stored in the photodiode 31, floating diffusion 33 and storage capacitor 36, respectively, and $C_{FD}+C_{CS}$ denotes the combined capacitance of the floating diffusion 33 and storage capacitor 36.

The signal φX, which is a common control signal supplied to every pixel 10, is set to a high level to maintain both the selection transistors 38 and 41 within the source follower amplifier 43 in the ON state. Before the photocharge storage is performed, the signals φT, φC and φR, which are also common control signals, are set to a high level to turn on the transfer transistor 32, storage transistor 34 and reset transistor 35 (time t0), whereby the floating diffusion 33 and storage capacitor 36 are reset (or initialized). At this point in time, the photodiode 31 is completely depleted. The potential at this point in time is shown in FIG. 14(a).

Next, φR is set to a low level to turn off the reset transistor 35, whereupon a noise signal N2, which equivalently contains a random noise generating in the floating diffusion 33 and storage capacitor 36 and a fixed pattern noise resulting from a variation in the threshold voltage of the transistor 37 in the source follower amplifier 43, is generated in the floating diffusion 33 (refer to FIG. 14(b)), and an output corresponding to this noise signal N2 appears in the pixel output line 141. At this timing (time t1), a sampling pulse φN2 is given to the memory section 22 to turn on the sampling transistor 26d so that the noise signal N2 outputted through the pixel output line 141 is brought into and held by the capacitor 25d.

Subsequently, φC is set to the low level to turn off the storage transistor 34, whereupon the signals stored in the floating diffusion 33 and storage capacitor 36 at this point in time are distributed to the floating diffusion 33 and the storage capacitor 36 according to the ratio of their capacitances $C_{FD}$ and $C_{CS}$ (refer to FIG. 14(c)). In this state, a noise signal N1, which contains a random noise generated when φC was turned off and a fixed pattern noise resulting from a variation in the threshold voltage of the transistor 37 in the source follower amplifier 43, is generated in the floating diffusion 33, and an output corresponding to this noise signal N1 appears in the pixel output line 141. At this timing (time t2), a sampling pulse φN1 is given to the memory section 22 to turn on the sampling transistor 26c so that the noise signal N1 outputted through the pixel output line 141 is brought into and held by the capacitor 25c.

Since the transfer transistor 32 is maintained in the ON state, the photocharges generated by light falling onto the photodiode 31 flow through the transfer transistor 32 (this state is shown in FIG. 7(b)) into the floating diffusion 33, and are stored in the floating diffusion 33, being superimposed on the noise signal N1 (time t3). If the floating diffusion 33 is saturated due to a large amount of photocharges produced in the photodiode 31 by strong incident light, the overflowing charges are stored through the storage transistor 34 into the storage capacitor 36 (refer to FIG. 14(d)). Setting the threshold voltage of the storage transistor 34 at an appropriately low level enables those charges to be efficiently transferred from the floating diffusion 33 to the storage capacitor 36. By this method, it is possible to effectively utilize the saturated charges without discarding them even if the floating diffusion 33 has a small capacitance $C_{FD}$ and can store only a small amount of charges in the maximally saturated state. In this manner, both the charges produced before charge saturation (overflow) at the floating diffusion 33 and those produced after charge saturation (overflow) can be reflected in the output.

After a predetermined photocharge storage time (exposure time) has elapsed, a sampling pulse φS1 is given to the memory section 22, with the storage transistor 34 in the OFF state, to turn on the sampling transistor 26a, whereby a signal corresponding to the charge stored in the floating diffusion 33 at that point in time (time t4) is extracted through the pixel output line 141 and held in the capacitor 25a (refer to FIG. 14(e)). The signal stored in the floating diffusion 33 at this point in time results from the superposition of a noise signal N1 and a signal S1 corresponding to the charge before an overflow. Accordingly, the signal held in the capacitor 25a equals S1+N1, which does not reflect the amount of charge stored in the storage capacitor 36.

Immediately after that, φC is set to the high level to turn on the storage transistor 34, whereupon the charge held in the floating diffusion 33 at that point in time is mixed with the charge held in the storage capacitor 36 (refer to FIG. 14(f)). In this state, a sampling pulse φS2 is given to the memory section 22 to turn on the sampling transistor 26b (time t5), whereby a signal corresponding to the charges held in the floating diffusion 33 and the storage capacitor 36, i.e. a signal resulting from the superposition of the noise signal N2 and the signal S2 corresponding to the charge after the overflow, is extracted through the pixel output line 141 and held in the capacitor 25b. Accordingly, the signal to be held in the capacitor 25b is S2+N2, which reflects the amount of charge stored in the storage capacitor 36.

By the process described to this point, the signals S1+N1, S2+N2, N1 and N2 are respectively held in the four capacitors 25a, 25b, 25c and 25d included in one memory section 22. Thus, one cycle of the image signal acquisition operation is completed. As already explained, the noise signals N1 and N2 containing the random noise and fixed pattern noise are obtained separately from the other signals containing these noise signals. These signals can be respectively read from the capacitors 25a, 25b, 25c and 25d and then subjected to a subtracting operation by an analogue computing circuit (not shown) to obtain high S/N image signals free from the influence of the noise signals N1 and N2. Since the charges that have overflowed from the floating diffusion 33 are not discarded but utilized, even a strong incident light barely causes saturation, so that the resultant signal can reflect the light. Thus, a wide dynamic range is ensured. The possibilities of widening the dynamic range in this manner are described in detail in the Japanese Unexamined Patent Application Publication No. 2006-245522 and other documents. Therefore, no explanation will be made in this specification.

(B) Operation Mode for Relatively Long Exposure Charge-Storage Time

Figure 15:
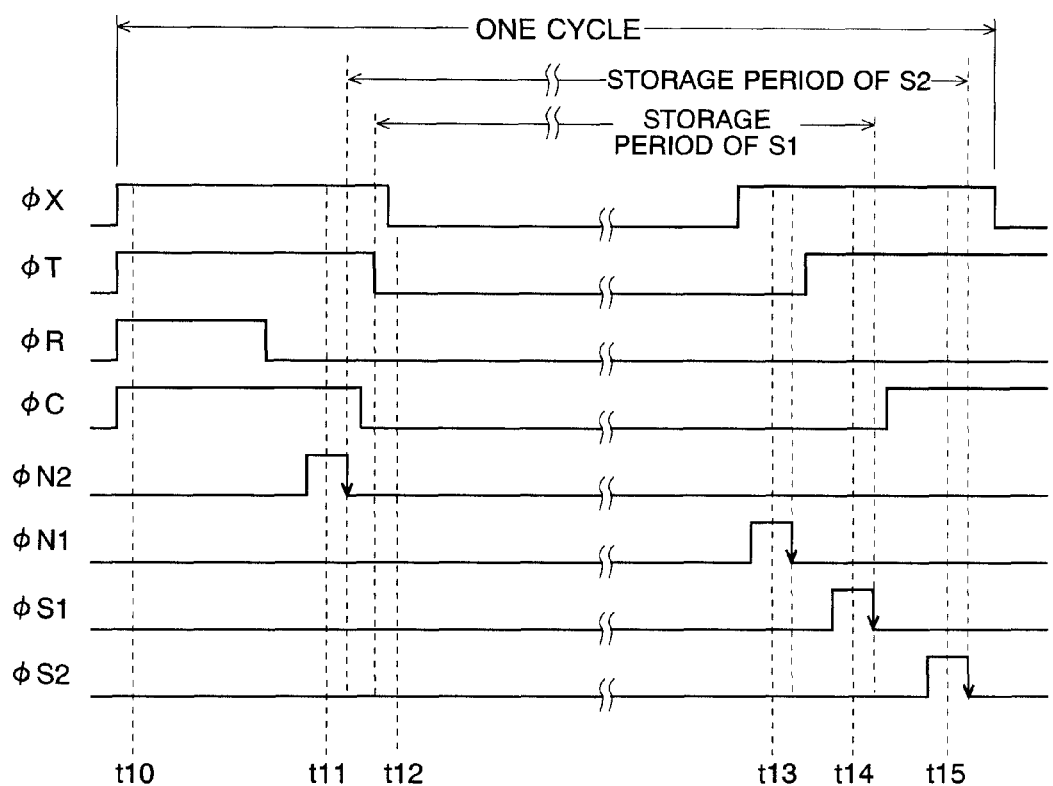
FIG. 15 is a drive timing chart of the solid-state image sensor of the present embodiment in the case where the photocharge storage time is relatively long.
Figure 16:
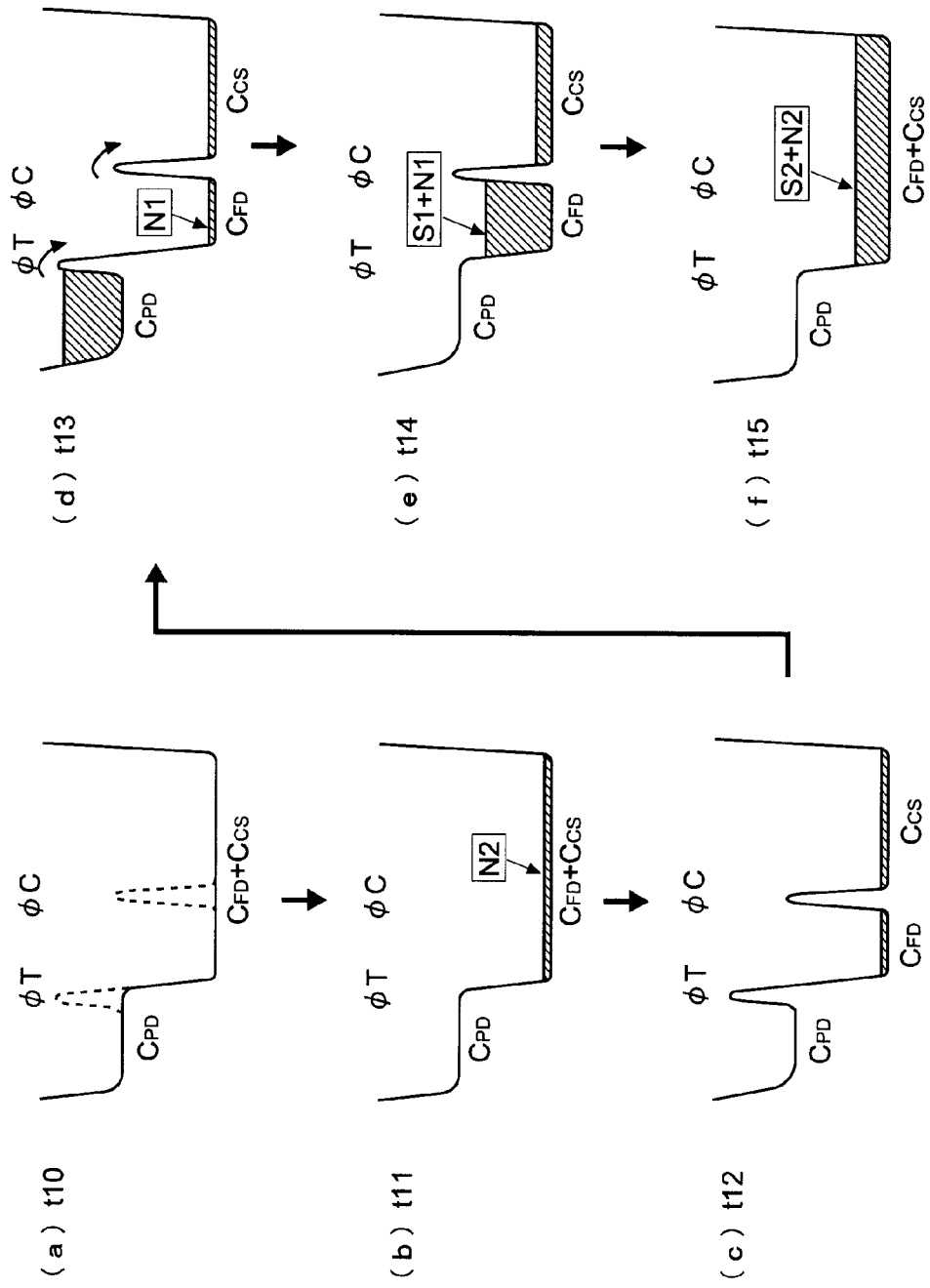
FIG. 16 is a schematic potential diagram inside a pixel during the operation shown in FIG. 15.

An operation for a relatively long photocharge storage time is hereinafter described. FIG. 15 is a drive timing chart in the case where the photocharge storage time is relatively long, and FIG. 16 is a schematic potential diagram inside the pixel in this operation.

The most significant difference from the case of the short photocharge storage time exists in that the transfer transistor 32 is turned off during the photocharge storage period so that the photocharges produced in the photodiode 31 will be stored in a depletion layer. Another difference is that, taking into account the long photocharge storage time, the selection transistors 38 and 41 of the source follower amplifier 43 are turned off for a predetermined period of time in order to reduce the power consumption.

Before the photocharge storage is performed, φT, φC and φR are set to high levels to turn on all of the transfer transistor 32, storage transistor 34 and reset transistor 35 (time t10), whereby the floating diffusion 33 and storage capacitor 36 are reset (or initialized). At this point in time, the photodiode 31 is completely depleted. The state of potential at this point in time is shown in FIG. 16(a).

Next, φR is set to the low level to turn off the reset transistor 35, whereupon a noise signal N2, which equivalently contains a random noise generating in the floating diffusion 33 and the storage capacitor 36 and a fixed pattern noise resulting from a variation in the threshold voltage of the transistor 37 in the source follower amplifier 43, is generated in the floating diffusion 33 (refer to FIG. 16(b)), and an output corresponding to this noise signal N2 appears in the pixel output line 141. At this timing (time t11), a sampling pulse φN2 is given to the memory section 22 to turn on the sampling transistor 26d, whereby the noise signal N2 is extracted through the pixel output line 141 and held in the capacitor 25d. The operations to this point are identical to those of the previously described operation mode for a short photocharge storage time.

Next, φC is set to the low level to turn off the storage transistor 34, whereupon the signals stored in the floating diffusion 33 and storage capacitor 36 at this point in time are distributed to the floating diffusion 33 and storage capacitor 36 according to the ratio of their capacitances $C_{FD}$ and $C_{CS}$. Furthermore, φT is set to the low level to turn off the transfer transistor 32, and φX is also set to the low level to turn off the two selection transistors 38 and 41 of the source follower amplifier 43 (time t12). As a result, a potential barrier is formed between the photodiode 31 and the floating diffusion 33, creating a condition where photocharges can be stored in the photodiode 31 (refer to FIG. 16(*c*)).

The photocharges produced by incident light falling onto the photodiode 31 are stored in the photodiode 31. When a charge saturation occurs in the photodiode 31, excessive charges overflow through the transfer transistor 32, to be stored in the floating diffusion 33 and superimposed on the noise signal that has been distributed as described previously. If the floating diffusion 33 is saturated by stronger incident light, the overflowing charges will be stored through the storage transistor 34 into the storage capacitor 36 (refer to FIG. 16(*d*)).

Setting the threshold voltage of the storage transistor 34 at a level appropriately lower than that of the transfer transistor 32 enables the charges saturated in the floating diffusion 33 to be efficiently transferred from the floating diffusion 33 to the storage capacitor 36 without being returned to the photodiode 31. By this method, it is possible to effectively use the saturated charges without discarding them even if the floating diffusion 33 has a small capacitance $C_{FD}$ and can store only a small amount of charges. In this manner, both the charges produced before the overflow at the floating diffusion 33 and those produced after the overflow can be reflected in the output.

After a predetermined photocharge storage time has elapsed, φX is set to the high level to turn on the selection transistors 38 and 41, after which a sampling pulse φN1 is given to the memory section 22 to turn on the sampling transistor 26*c*, whereby a noise signal N1 corresponding to the signal charge stored in the floating diffusion 33 at this point in time (time t13) is extracted through the pixel output line 14 and held in the capacitor 25*c*. The noise signal N1 at this point in time contains a fixed pattern noise due to a variation in the threshold voltage of the transistor 37 in the source follower amplifier 43. It should be noted that this signal contains not only the noise but also a portion of the photocharges produced by photoelectric conversion, which are also regarded as a noise in the present case.

Next, φT is set to the high level to turn on the transfer transistor 32, whereupon the photocharges stored in the photodiode 31 are completely transferred to the floating diffusion 33 (refer to FIG. 16(*e*)). Immediately after that (time t14), a sampling pulse φS1 is given to the memory section 22 to turn on the sampling transistor 26*a*, whereby a signal corresponding to the charge stored in the floating diffusion 33 is extracted through the pixel output line 14 and held in the capacitor 25*a*. This signal results from the superposition of the aforementioned noise signal N1 and the signal corresponding to the charge stored in the photodiode 31, i.e. the signal S1 before the overflow, and hence equals S1+N1.

Subsequently, φC is set to the high level to turn on the storage transistor 34, whereupon the charge held in the floating diffusion 33 at that point in time is mixed with the charge held in the storage capacitor 36 (refer to FIG. 16(*f*)). In this state, a sampling pulse φS2 is given to the memory section 22 to turn on the sampling transistor 26*b* (time t15), whereby a signal corresponding to the charges held in the floating diffusion 33 and storage capacitor 36 are extracted through the pixel output line 141 and held in the capacitor 25*b*. This signal equals S2+N2.

As a result of the processes described to this point, the signals S1+N1, S2+N2, N1 and N2 are respectively held in the four capacitors 25*a*, 25*b*, 25*c* and 25*d* included in one memory section 22. Thus, one cycle of image signal acquisition is completed. As in the case of the operation mode for the short photocharge storage time, the noise signals N1 and N2 containing the random noise and fixed pattern noise are obtained separately from the other signals containing these noise signals. These signals can be respectively read from the capacitors 25*a*, 25*b*, 25*c* and 25*d* and then subjected to subtraction or other analogue computing to obtain high S/N image signals free from the influence of the noise signals N1 and N2. Since the charges that have overflowed from the floating diffusion 33 are not discarded but utilized, even a strong incident light barely causes saturation, so that the resultant signal can reflect the light. Thus, a wide dynamic range is ensured.

As described previously, the control signals φX, φT, φR and φC supplied to each pixel 10 are common to all the pixels. Therefore, the aforementioned operations of storing photocharges and transferring signals from each pixel 10 to the memory section 22 are simultaneously performed at all the pixels 10. That is, by one cycle of these operations, one frame of image signals are held in the memory sections 22 in the memory section unit row 21 in FIGS. 3 and 4. In the burst reading mode, the operations are repeated 104 cycles to store the image signals in the memory sections 22 in the entire memory section unit rows 21. In the 105$^{th}$ and subsequent cycles, the operation of writing signals in the memory sections 22 is once more initiated from the topmost memory section unit row 21. Thus, the signal-holding operation is cyclically carried out. This process is continued, for example, until a command signal for halting the imaging is externally given. When the command signal for halting the imaging is given and the imaging is thereby discontinued, the latest 104 frames of image signals are held in the memory areas 3*a* and 3*b*. By sequentially reading these signals, a series of image signals corresponding to 104 frames can be obtained.

When, as described previously, new signals are to be held in the capacitors of a memory section 22 in which some signals are already present, it is necessary to reset the capacitors in order to discard those older signals. For this purpose, though not shown in the figures, a transistor for resetting is connected to each pixel output line 141. To reset the capacitor of a given memory section, the sampling transistor of the memory section is turned on and, simultaneously, the transistor for resetting connected to the corresponding pixel output line is turned on, whereby the signal stored in the capacitor is reset through the sampling transistor and the pixel output line. After this resetting operation is performed, a new signal is held in the capacitor.

Figure 17:
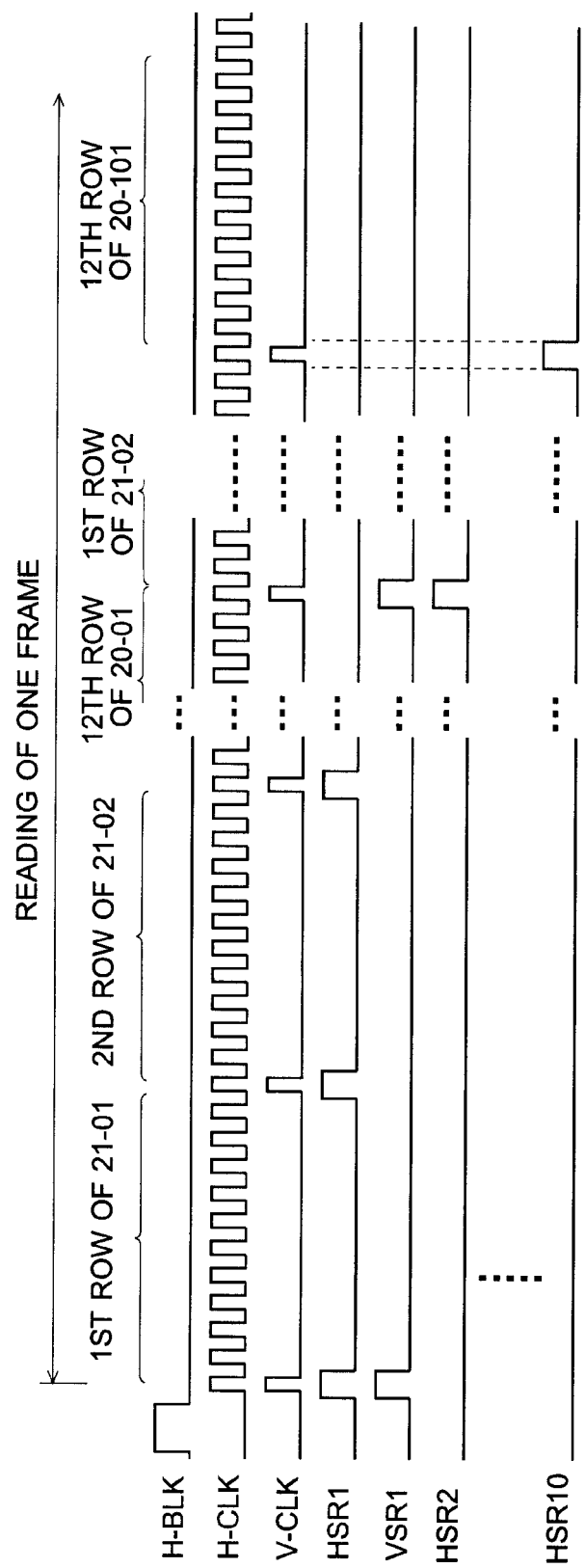
FIG. 17 is an operation timing chart of sequential reading for one frame in the continuous reading mode of the solid-state image sensor of the present embodiment.

The operation of sequentially reading signals from the memory areas 3*a* and 3*b* is hereinafter described. FIG. 17 is an operation timing chart of sequential reading for one frame in the continuous reading mode, FIG. 18 is an operation timing chart of sequential reading in the burst reading mode, and FIG. 19 is a model diagram showing the order of reading at each memory section 22.

The signals held in the capacitors 25 of each memory section 22 are read by sequentially turning on the reading transistors 27 connected to the same output line 23. Since the four reading transistors 27*a*-27*d* of the same memory section 22 are respectively connected to the different output lines 23*a*-23*d*, the signals held in each of the four capacitors 25*a*-25*d* in the same memory section 22 can be simultaneously read. Using these signals, the subtracting operations of (S1+N1)−N1 and (S2+N2)−N2 can be performed by a subtraction circuit (now shown) provided inside or outside the sensor to extract the signals S1 and S2 free from the random noise and fixed pattern noise. Which of S1 and S2 should be used is determined with reference to an appropriate signal level equal to or lower than the saturation level of the signal S1; S1 is selected when the signal is equal to or higher than the reference level, and S2 when the signal is lower than the reference level. By performing this selection below the signal saturation level, it is possible to avoid the influence of saturation variation of S1.

As one example, the reading order at the leftmost memory section unit block 50 in the 320 memory section units 20 corresponding to the first frame in FIG. 11 is hereinafter described. In the leftmost memory section unit 20-01, image signals of eleven pixels are sequentially read from the memory sections 22 in the left-to-right direction of the first horizontal row shown in FIG. 8. This memory section unit 20-01 is selected by activating the horizontal shift register HSR1 and vertical shift register VSH1. The horizontal reading clock H-CLK produces a moving pulse signal that turns on the reading transistors 27 of the memory sections 22, one by one, from left to right in the horizontal direction. After the reading of one row is completed, a clock V-CLK for shifting the vertical reading position is supplied, whereby the memory sections 22 in the next (second) row are selected. Then, these memory sections 22 are similarly selected, from left to right, for the reading of eleven pixels. Such a process of reading pixel signals is repeated until the end of the twelfth row.

Figure 18:
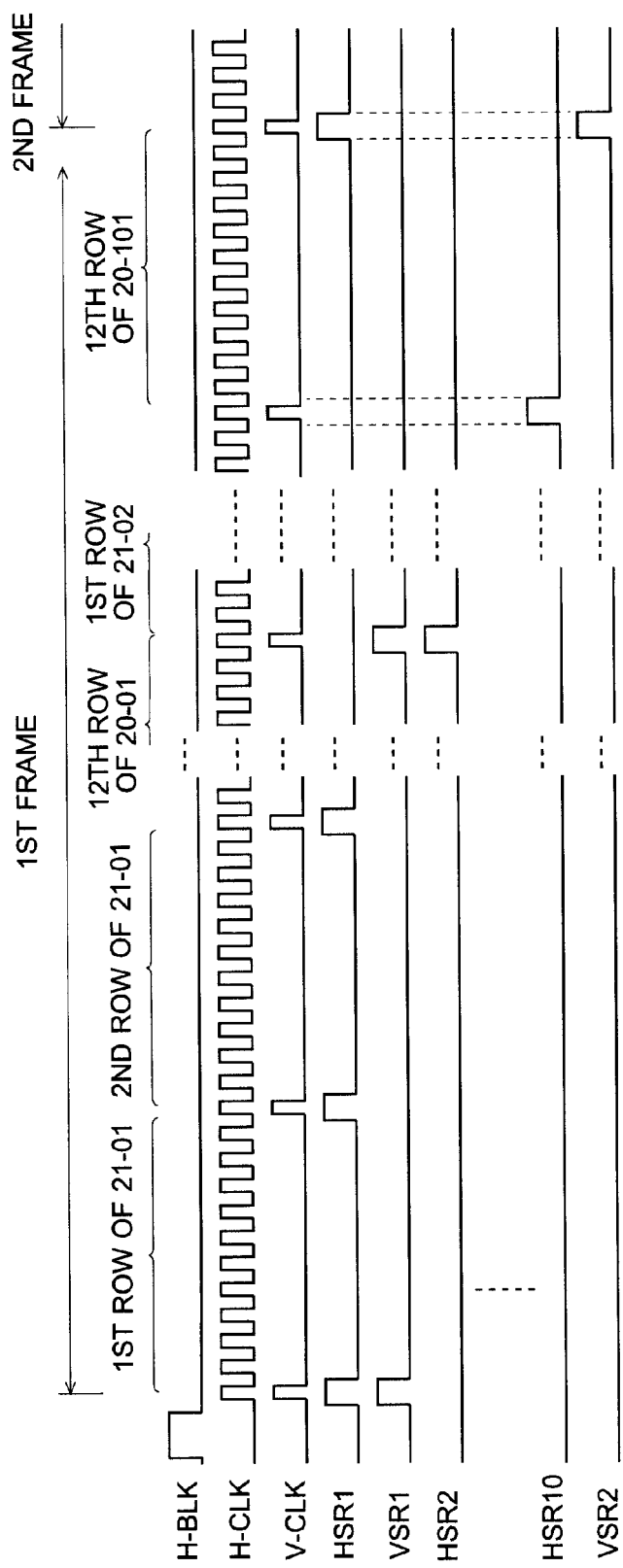
FIG. 18 is an operation timing chart of sequential reading in the burst reading mode of the solid-state image sensor of the present embodiment.
Figure 19:
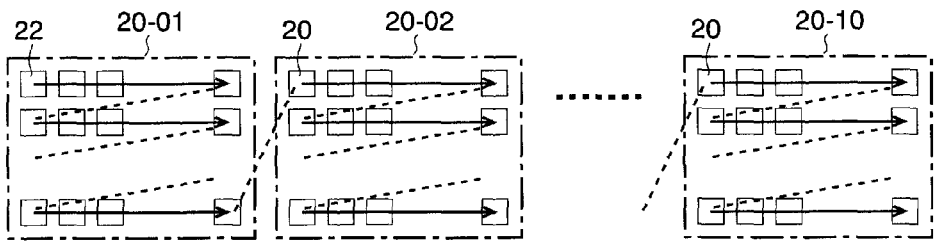
FIG. 19 is a model diagram showing the order of reading at each memory section.

Subsequently, the horizontal shift register HSR2 and vertical shift register VSR1 are activated to select the memory section unit 20-02 on the right, and this memory section unit 20-02 becomes the target of reading, as shown in FIGS. 18 and 19. Then, as in the previous case, the signals are read by turning on the reading transistors 27 of each memory section, for one pixel after another, in the order of row →column. The sequential selection of each memory section unit is continued until the memory section unit 20-10. When the reading of the memory sections 22 in the twelfth row of the memory section unit 20-10 is ended, the reading process for one frame is completed. Concurrently, in the other memory section unit blocks 50, the operation of reading signals from the memory sections of the corresponding memory section units is similarly performed.

In the case of the sequential reading in the burst reading mode, after the pixel signals of the first frame have been entirely read in the previously described manner, the reading of pixel signals of the second frame is subsequently initiated. That is, as shown in FIG. 18, the horizontal shift register HSR1 and the vertical shift register VSR2 are activated to select the leftmost memory section unit of the second row shown in FIG. 11, and the reading operation is performed in the same order as in the case of the first frame. This process is repeated to perform the reading operation through the end of the 104$^{th}$ frame.

It should be noted that the reading process is not limited to this one but may be appropriately modified. For example, in the burst reading mode, the pixel signals held in the memory section units 20 aligned in the uppermost row are not always the oldest signals, because there is no previously designated frame at which the process of sequentially writing signals for each frame from upper to lower rows should be halted. Accordingly, it is preferable to start the sequential reading operation from the row subsequent to the row at which the last writing was performed. By this method, the image signals are acquired in chronological order.

Figure 20:
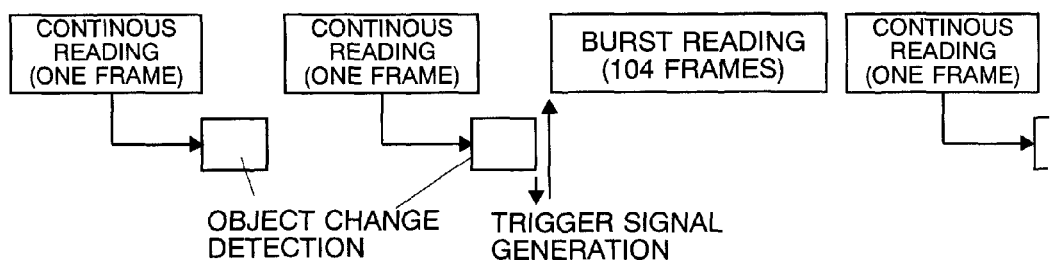
FIG. 20 is a schematic timing chart showing one mode of an imaging operation using the solid-state image sensor of the present embodiment.
Figure 21:
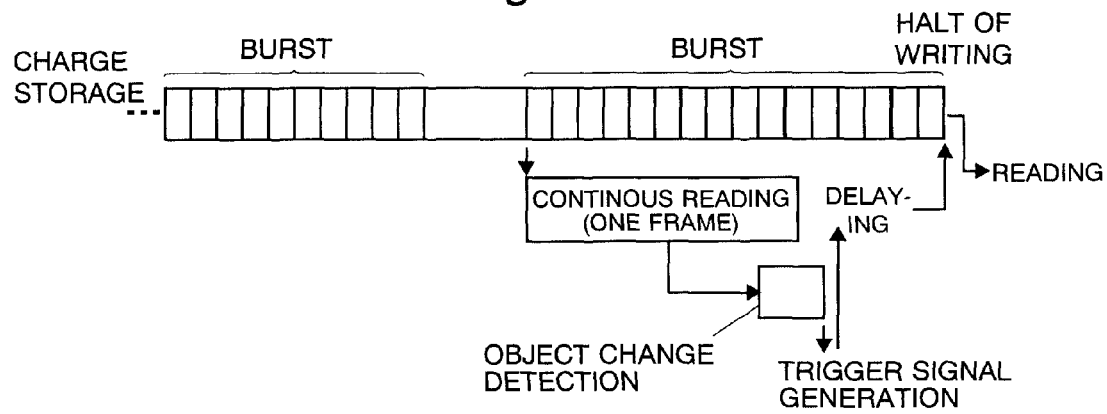
FIG. 21 is a schematic timing chart showing one mode of an imaging operation using the solid-state image sensor of the present embodiment.

The continuous reading mode and burst reading mode of the present solid-state image sensor can be easily and quickly switched in response to an external control command since the differences between the two modes are rather minor ones that relate to the control signals supplied to the pixels, the drive signals for controlling the horizontal shift registers and vertical shift registers and so on. Hereinafter, a mode of the imaging operation of the present solid-state image sensor using the aforementioned switching operation is described. FIGS. 20 and 21 are schematic timing charts each showing one mode of the imaging operation using the present solid-state image sensor.

In the example shown in FIG. 20, the image signals that are read one frame after another by the previously described continuous reading mode are processed by a image processing circuit external to the solid-state image sensor (or, if possible, by a built-in circuit of the solid-state image sensor) to detect a movement of or change in an object of imaging. For this process, various kinds of conventionally known motion detection processing techniques are available, such as using the differences in the image signals between a plurality of frames. The process may detect a change or movement within a specific range of the image selected by a user rather than the entire image. When a movement of or change in an object has been recognized as a result of such a process, a corresponding trigger signal is produced. When this trigger signal is given, the operation mode changes from the continuous reading mode to the burst reading mode to perform high-speed imaging of 104 frames (or an appropriately specified number of frames). The pixel signals that have been read from the sensor in the burst reading mode are stored in an external frame memory. After the burst reading process for 104 frames (or an appropriately specified number of frames) is completed, the operation returns to the continuous reading mode.

The example shown in FIG. 21 is basically a repetition of the storage of photocharges and the transfer of signals from each pixel at the repetition rate in the burst reading mode, and every time this process is repeated a predetermined number of frames, the storage of photocharges in the continuous reading mode and the sequential reading of the thereby obtained pixel signals to the outside are performed. In this sequential reading process, the storage of photocharges at the repetition rate in the burst reading mode and the transfer of signals from each pixel can be concurrently performed. Similar to the previous example, a movement of or change in an object is detected by an external image processing circuit and, based on the detection result, a trigger signal is generated. When the trigger signal is given, the signal transfer from each pixel to the memory section in the burst reading mode is halted, after which the writing of signals may also be halted with a delay corresponding to a predetermined period of time or predetermined number of frames from the generation of the trigger signal.

In the present example, the memory sections 22 in the memory areas 3*a* and 3*b* hold the past 104 frames of image signals. Accordingly, it is possible to obtain not only the images that follow the generation of the trigger signal but also the images that precede the generation of the trigger signal. In the timing chart shown in FIG. 21, the exposure time is set longer when the photocharges corresponding to the signals read in the continuous reading mode are to be stored. It is possible to set this exposure time equal to the exposure time for the photocharge storage in the burst reading mode. By this setting, the period of time where no image is obtained is shortened in the case where the images that precede the generation of the trigger signal are needed.

In the solid-state image sensor according to the present invention, an analogue voltage signal is extracted through the source follower amplifier 43 to the pixel output line in each pixel 10. Therefore, it is possible to simultaneously perform sampling at both the memory sections provided for the burst reading and those provided for the continuous reading and hold signals in the respective capacitors. According to this method, even if the continuous reading is performed in the middle of the process, a sequence of high-speed images can be obtained without temporarily halting the burst reading.

The foregoing descriptions assumed that all the pixel signals should be extracted in the continuous reading mode. However, when, for example, the image is used to monitor an occurrence of a change in an object of interest and produce a trigger signal, the spatial resolution can be somewhat compromised in many cases. Accordingly, a thin-out reading process may be performed, for example, by selecting every second or third pixel in the horizontal direction on the pixel area and every second or third pixel in the vertical direction, to reduce the number of pixel signals to be read for one frame and thereby shorten the reading time.

Figure 22:
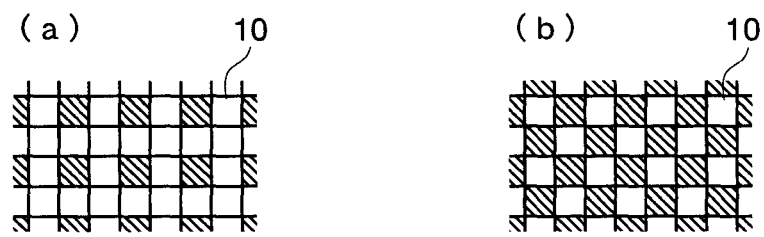
FIG. 22 is a diagram showing examples of pixels to be selected in a thin-out reading operation in the solid-state image sensor of the present embodiment.

FIG. 22(a) is a model diagram showing the pixels 10 to be read in a thin-out reading process in which every other pixel is selected in both the horizontal and vertical directions on the pixel area 2 (2a or 2b). The shaded areas in this diagram denote the pixels to be read. In this case, the number of pixel signals to be read is one-quarter of the total number, and the total reading time is shortened to approximately 6.6 μsec. FIG. 22(b) is a model diagram showing the pixels 10 to be read in a thin-out reading process in which every other pixel is selected only in the horizontal direction on the pixel area 2 (2a and 2b). In this case, the number of pixel signals to be read is one-half of the total number, and the total reading time is approximately 13.2 μsec.

Figure 23:
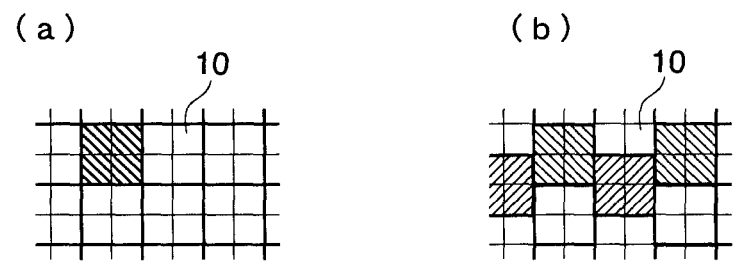
FIG. 23 is a diagram showing examples of pixels to be selected in an add reading operation in the solid-state image sensor of the present embodiment.

Although the aforementioned thin-out reading methods result in a decrease in the number of available signals, it is also possible to read the sum of signals extracted from a plurality of pixels neighboring each other on the pixel area 2 (2a or 2b). As already described, each memory section unit block 50 has a common output line 23. Therefore, when the reading transistors 27 in different memory sections 22 are simultaneously turned on to output the voltages held in the capacitors 25, the voltage signals will be added together in analogue form on the output line 23. Accordingly, it is possible, for example, to add and output pixel signals of four neighboring pixels arranged in two rows and two columns as shown in FIG. 23(a), in which case the total reading time is approximately 6.6 μsec, i.e. as short as in the case of the previously described thin-out method. Furthermore, the S/N ratio is higher than in the previous thin-out method since no signal is wasted.

In selecting a plurality of pixels for summation, the transistors that should be simultaneously turned on for reading may be selected in such a manner that the pixel sets neighboring each other in the horizontal and vertical directions in the pixel area 2 (2a or 2b) have an alternating boundary pattern as shown in FIG. 23(b) rather than an identical boundary pattern in both horizontal and vertical directions as in the previous example. This method is effective in reducing, to some extent, the decrease in the visual resolution due to the integration of pixel signals of a plurality of pixels.

The aforementioned thin-out reading and summation of a plurality of pixels can also be performed by changing the control mode of the vertical shift register circuit and horizontal shift register circuit for driving the memory sections 22 within the memory area 3a and 3b; there is no influence on the configuration of the pixels 10 within the pixel area 2 (2a or 2b) or other designs of the sensor. Therefore, there is a high degree of freedom of changing the pixel signal reading method in the previously described manner.

It should be noted that the foregoing embodiments are mere examples of the solid-state image sensor and its drive method according to the present invention; any change, modification or addition that is appropriately made within the spirit of the present invention naturally falls within the scope of the claims of the present patent application.

The invention claimed is:

1. A drive method for a solid-state image sensor having a plurality of pixels arranged in a two-dimensional array; each pixel including at least a photoelectric conversion element for receiving light and producing photocharges, a transfer element for transferring the photocharges produced by the photoelectric conversion element to a detection node, and a buffer element for sending a signal from the detection node to a pixel output line; the pixel output line being independently provided for each pixel; one or more memory sections being provided for each pixel; the memory section being used to hold a signal extracted from each pixel through the pixel output line, and the method being characterized in that at least one of following modes is performed:

a first drive mode, in which an operation of storing photocharges in each pixel and an operation of holding a signal extracted from the pixel through the pixel output line in one of the memory sections are performed simultaneously at all the pixels and, subsequently, the pixels and the memory sections are operated so that the signals corresponding to one frame are sequentially read from the memory sections corresponding to the pixels and outputted; and a second drive mode, in which the operation of storing photocharges in each pixel and the operation of holding a signal extracted from the pixel through the pixel output line in one of the memory sections are performed repeatedly and simultaneously at all the pixels while the memory section to hold the signal is sequentially selected, and after the signals corresponding to a plurality of frames are held in the memory sections, the pixels and the memory sections are operated so that the signals corresponding to the plurality of frames are sequentially read from the memory sections corresponding to the pixels and outputted;

wherein a plurality of memory sections are provided for each pixel, and the first drive mode and the second drive mode are selectively or concurrently performed.

2. The drive method for a solid-state image sensor according to claim 1, which is characterized in that:

one memory section corresponding to one pixel includes at least a memory unit for holding a noise signal and a memory unit for holding a signal corresponding to the photocharge;

an operation of simultaneously holding the noise signals at all the pixels and an operation of simultaneously holding the signals corresponding to the photocharges at all the pixels are performed at different timings during the operations of storing photocharges in each pixel and holding a signal extracted from the pixel through the pixel output lines in one of the memory sections; and when the signals are sequentially read from the memory sections, the noise signals and the signals corresponding to the photocharges are concurrently read from the memory units and outputted.

3. The drive method for a solid-state image sensor according to claim 1, which is characterized in that:

each pixel includes at least one charge storage element for storing photocharges that have overflowed from the photoelectric conversion element via the transfer element or from the detection node during the operation of storing photocharges;

one memory section corresponding to one pixel has four memory units;

an operation of sequentially holding a noise signal before an overflow, a noise signal after an overflow, a signal corresponding to the charge before an overflow and a signal corresponding to the charge after an overflow through the pixel output lines in the four memory units in each pixel, respectively, is performed simultaneously at all the pixels during the operations of storing photocharges in each pixel and the operations of storing photocharges in each pixel and holding a signal extracted from the pixel through the pixel output lines in one of the memory sections; and when the signals are sequentially read from the memory sections, the noise signal before the overflow, the noise signal after the overflow, the signal corresponding to the charge before the overflow and the signal corresponding to the charge after the overflow are concurrently read from the memory units and outputted.

4. The drive method for a solid-state image sensor according to claim 1, which is characterized in that a signal-holding operation is performed in which the plurality of memory sections are cyclically used so that, after the signals are held in all the memory sections corresponding to the pixels, the memory section holding the oldest signal is reset to hold a new signal, and an operation of holding a new signal in the memory section is halted in response to a halt instruction.

5. The drive method for a solid-state image sensor according to claim 4, which is characterized in that a specific event is detected based on image information derived from a portion or entirety of one or more frames of images produced by performing the first drive mode, and the second drive mode is performed according to the detection result.

6. The drive method for a solid-state image sensor according to claim 4, which is characterized in that the first drive mode and the second drive mode are alternately performed an arbitrary number of times or at arbitrary intervals of time.

7. The drive method for a solid-state image sensor according to claim 1, which is characterized in that a portion of the memory sections for the second drive mode is utilized during an operation in the first drive mode.

8. The drive method for a solid-state image sensor according to claim 1, which is characterized in that the memory sections for the first drive mode and those for the second drive mode are independent of each other.

9. The drive method for a solid-state image sensor according to claim 1, which is characterized in that, when the signals are sequentially read from the memory sections, a set of signals corresponding to specific pixels among the plurality of pixels arranged in the two-dimensional array are selectively and sequentially read and outputted.

10. The drive method for a solid-state image sensor according to claim 1, which is characterized in that the signals corresponding to neighboring or adjacent pixels among the plurality of pixels arranged in a two-dimensional array are simultaneously read from the memory sections and subjected to an analogue adding or averaging operation.

11. The drive method for a solid-state image sensor according to claim 10, which is characterized in that a combination of the plurality of pixels to be involved in the analogue adding or averaging operation is selected alternately in horizontal and vertical directions among the two-dimensionally arrayed pixels.

12. The drive method for a solid-state image sensor according to claim 1, which is characterized in that the signals corresponding to one or more pixels at a same spatial location but in different frames that are temporally next to or close to each other are read from the memory sections and subjected to an analogue adding or averaging operation.

13. A solid-state image sensor, which is characterized by comprising:
a) a plurality of pixels arranged in a two-dimensional array, each pixel including a photoelectric conversion element for receiving light and producing photocharges, a transfer element for transferring the photocharges produced by the photoelectric conversion element to a detection node, and a buffer element for sending a signal from the detection node to a pixel output line to be mentioned later;
b) a pixel output line independently provided for each pixel;
c) a plurality of memory sections provided for each pixel in order to hold a signal extracted from the pixel through the pixel output line; and
d) a drive control unit for performing following two drive modes:
a first drive mode, in which an operation of storing photocharges in each pixel and an operation of holding a signal extracted from the pixel through the pixel output line in one of the memory sections are performed simultaneously at all the pixels and, subsequently, the pixels and the memory sections are operated so that the signals corresponding to one frame are sequentially read from the memory sections corresponding to the pixels and outputted; and
a second drive mode, in which the operation of storing photocharges in each pixel and the operation of holding a signal extracted from the pixel through the pixel output line in one of the memory sections are performed repeatedly and simultaneously at all the pixels while the memory section to hold the signal is sequentially selected, and after the signals corresponding to a plurality of frames are held in the memory sections, the pixels and the memory sections are operated so that the signals corresponding to the plurality of frames are sequentially read from the memory sections corresponding to the pixels and outputted.

14. The solid-state image sensor according to claim 13, which is characterized in that:
one memory section corresponding to one pixel includes at least a memory unit for holding a noise signal and a memory unit for holding a signal corresponding to the photocharge; and
the drive control unit is configured so that:
an operation of simultaneously holding the noise signals at all the pixels and an operation of simultaneously holding the signals corresponding to the photocharges at all the pixels are performed at different timings during the operations of storing photocharges in each pixel and holding a signal extracted from the pixel through the pixel output lines in one of the memory sections; and
when the signals are sequentially read from the memory sections the noise signals and the signals corresponding to the photocharges are concurrently read from the memory units and outputted.

15. The solid-state image sensor according to claim 13, which is characterized in that:
each pixel includes at least one charge storage element for storing photocharges that have overflowed from the photoelectric conversion element via the transfer element or from the detection node during the operation of storing photocharges;
one memory section corresponding to one pixel has four memory units; and
the drive control unit is configured so that:
an operation of sequentially holding a noise signal before an overflow, a noise signal after an overflow, a signal corresponding to the charge before an overflow and a signal corresponding to the charge after an overflow through the pixel output lines in the four memory units in each pixel, respectively, is performed simultaneously at all the pixels during the operations of storing photocharges in each pixel and the operations of storing photocharges in each pixel and holding a signal extracted from the pixel through the pixel output lines in one of the memory sections; and when the signals are sequentially read from the memory sections, the noise signal before the overflow, the noise signal after the overflow, the signal corresponding to the charge before the overflow and the signal corresponding to the charge after the overflow are concurrently read from the memory units and outputted.

16. The solid-state image sensor according to claim 13, which is characterized in that the drive control unit is configured so that a signal-holding operation is performed in which the plurality of memory sections are cyclically used so that, after the signals are held in all the memory sections corresponding to the pixels, the memory section holding the oldest signal is reset to hold a new signal, and an operation of holding a new signal in the memory section is halted in response to a halt instruction.

17. The solid-state image sensor according to claim 16, which is characterized in that:

an event detection unit for detecting a specific event based on image information derived from a portion or entirety of one or more frames of images produced by performing the first drive mode is provided; and the drive control unit performs the second drive mode according to a detection by the event detection unit.

18. The solid-state image sensor according to claim 16, which is characterized in that the drive control unit alternately performs the first drive mode and the second drive mode an arbitrary number of times or at arbitrary intervals of time.

19. The solid-state image sensor according to claim 13, which is characterized in that a portion of the memory sections for the second drive mode is utilized during an operation in the first drive mode.

20. The solid-state image sensor according to claim 13, which is characterized in that the memory sections for the first drive mode and those for the second drive mode are independent of each other.

21. The solid-state image sensor according to claim 13, which is characterized in that, when the signals are sequentially read from the memory sections, the drive control unit selectively and sequentially reads a set of signals corresponding to specific pixels among the plurality of pixels arranged in the two-dimensionally array and outputs these signals.

22. The solid-state image sensor according to claim 13, which is characterized in that the drive control unit simultaneously reads, from the memory sections, the signals corresponding to neighboring or adjacent pixels among the plurality of pixels arranged in a two-dimensional array, and subjects these signals to an analogue adding or averaging operation.

23. The solid-state image sensor according to claim 22, which is characterized in that a combination of the plurality of pixels to be involved in the analogue adding or averaging operation is selected alternately in horizontal and vertical directions among the two-dimensionally arrayed pixels.

24. The solid-state image sensor according to claim 13, which is characterized in that the drive control unit reads, from the memory sections, the signals corresponding to one or more pixels at a same spatial location but in different frames that are temporally next to or close to each other, and subjects these signals to an analogue adding or averaging operation.

\* \* \* \* \*